US012675447B1

(12) United States Patent
Lowe

(10) Patent No.: US 12,675,447 B1
(45) Date of Patent: Jul. 7, 2026

(54) SYSTEMS AND METHODS FOR SECURE DATA MODELS AND SYNCHRONIZATION FOR INTERACTIVE LEGACY

(71) Applicant: AFIP MEDIA Inc., Leduc (CA)

(72) Inventor: Jayson Lowe, Edmonton (CA)

(73) Assignee: AFIP MEDIA Inc., Leduc (CA)

( * ) Notice: Subject to any disclaimer, the term of this patent is extended or adjusted under 35 U.S.C. 154(b) by 0 days.

(21) Appl. No.: 19/380,402

(22) Filed: Nov. 5, 2025

(51) Int. Cl.
*G06F 16/21* (2019.01)
*G06F 16/27* (2019.01)
*G06F 16/28* (2019.01)
*G06F 21/60* (2013.01)
*G06F 21/62* (2013.01)

(52) U.S. Cl.
CPC .......... *G06F 16/211* (2019.01); *G06F 16/219* (2019.01); *G06F 16/27* (2019.01); *G06F 16/289* (2019.01); *G06F 21/602* (2013.01); *G06F 21/6227* (2013.01)

(58) Field of Classification Search
CPC ...... G06F 16/211; G06F 16/27; G06F 16/289; G06F 16/219; G06F 21/602; G06F 21/6227
USPC ....................................................... 707/803
See application file for complete search history.

(56) References Cited

U.S. PATENT DOCUMENTS

| | | | |
|---|---|---|---|
| 2008/0140644 A1* | 6/2008 | Franks | G06F 16/9535 707/999.005 |
| 2013/0254199 A1* | 9/2013 | Surendran | G06F 16/36 707/736 |
| 2014/0282913 A1 | 9/2014 | Vigil | |
| 2024/0070402 A1* | 2/2024 | Thai | G06F 40/30 |
| 2025/0201234 A1 | 6/2025 | Singh et al. | |
| 2025/0378488 A1* | 12/2025 | George | G06Q 40/024 |
| 2026/0030275 A1* | 1/2026 | Pena Pena | G06F 16/334 |

FOREIGN PATENT DOCUMENTS

| | | |
|---|---|---|
| IN | 202441073005 A | 10/2024 |
| IN | 202541052221 A | 6/2025 |

* cited by examiner

*Primary Examiner* — Cam Linh T Nguyen
(74) *Attorney, Agent, or Firm* — CALDWELL LLC

(57) ABSTRACT

A system configured to: receive input data at a knowledge-harvesting engine, generate, using the knowledge-harvesting engine, a structured knowledge object, wherein generating the structured knowledge object includes: extracting a plurality of features from the input data using an extraction pipeline, assigning contextual tags to each feature of the plurality of features using a tagging pipeline, wherein the tagging pipeline is configured to associate each feature with one or more knowledge elements as a function of one or more of semantic, temporal, and relational characteristics of the feature, and encoding paired contextual tags and features of each feature of the plurality of features into the structured knowledge object as fields of a data schema, and store the structured knowledge object in a secure vault data structure implemented in a networked computing environment.

20 Claims, 7 Drawing Sheets

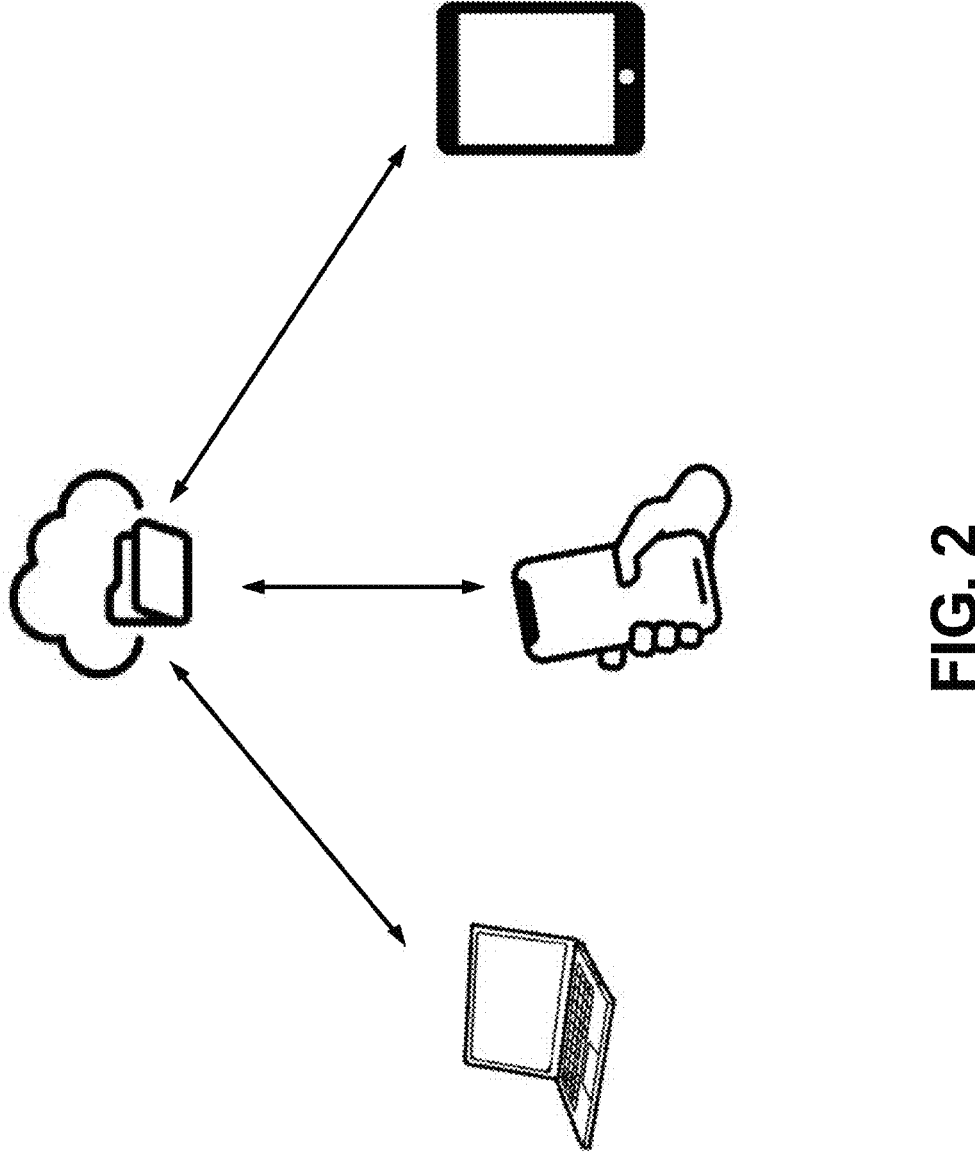
FIG. 2

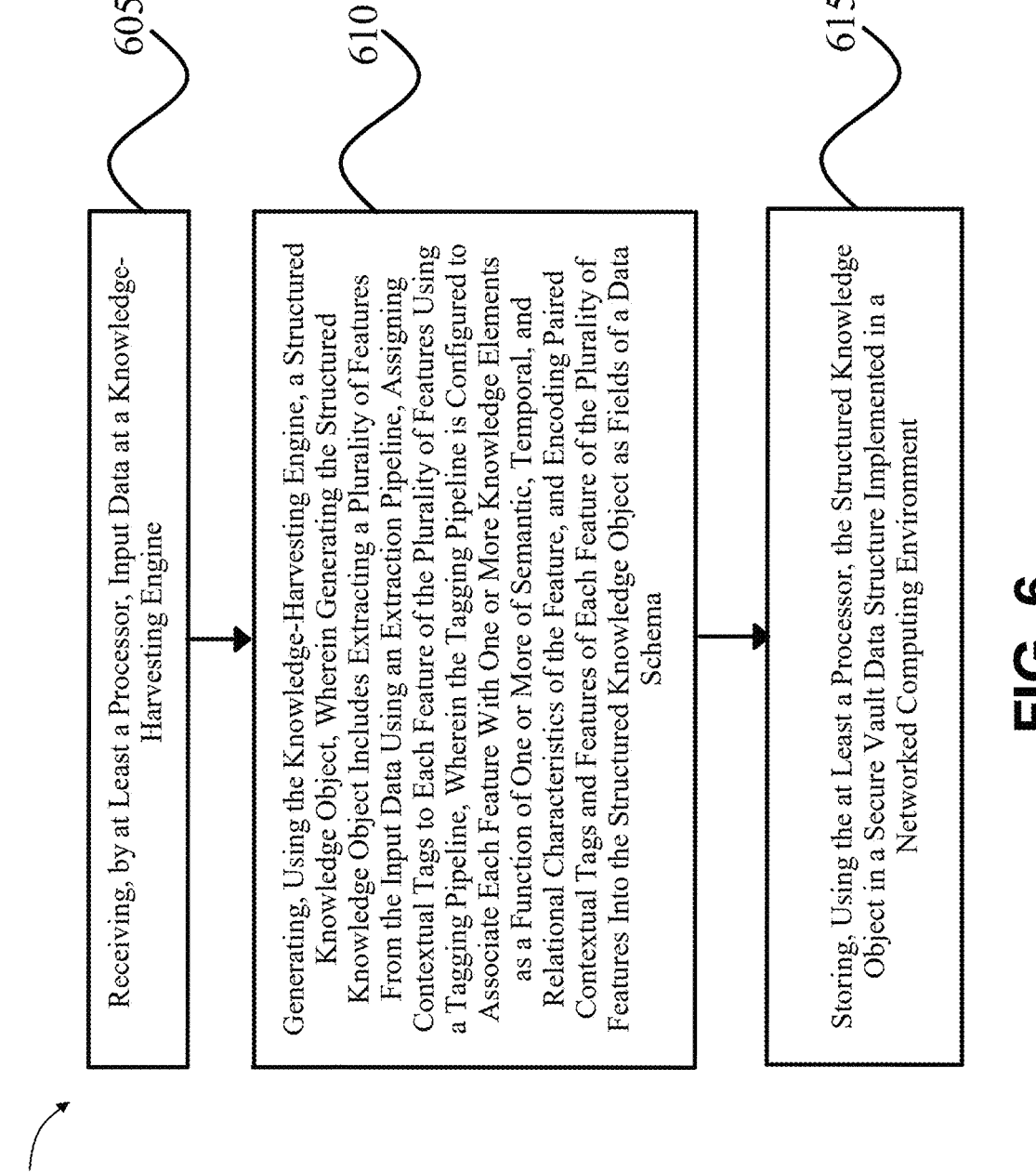

605

Receiving, by at Least a Processor, Input Data at a Knowledge-Harvesting Engine

610

Generating, Using the Knowledge-Harvesting Engine, a Structured Knowledge Object, Wherein Generating the Structured Knowledge Object Includes Extracting a Plurality of Features From the Input Data Using an Extraction Pipeline, Assigning Contextual Tags to Each Feature of the Plurality of Features Using a Tagging Pipeline, Wherein the Tagging Pipeline is Configured to Associate Each Feature With One or More Knowledge Elements as a Function of One or More of Semantic, Temporal, and Relational Characteristics of the Feature, and Encoding Paired Contextual Tags and Features of Each Feature of the Plurality of Features Into the Structured Knowledge Object as Fields of a Data Schema

615

Storing, Using the at Least a Processor, the Structured Knowledge Object in a Secure Vault Data Structure Implemented in a Networked Computing Environment

SYSTEMS AND METHODS FOR SECURE DATA MODELS AND SYNCHRONIZATION FOR INTERACTIVE LEGACY

FIELD OF THE INVENTION

The present invention generally relates to the field of multimodal data processing and secure storage architecture. In particular, the present invention is directed to systems and methods for secure data models and synchronization for interactive legacy.

BACKGROUND

Modern computing environments struggle to preserve complex information in a form that remains useful across different contexts and over long periods of time. Audio, video, and text inputs are typically captured as raw files, leaving them unstructured and difficult to analyze or search in a consistent manner. Even when such data is stored, conventional architectures rarely maintain the contextual attributes, relationships, or lineage that would allow later users to interpret the content with fidelity. Synchronization between distributed devices and cloud environments introduces additional challenges, such as conflicts, bandwidth constraints, and version drift can distort or fragment the stored information. Finally, when outputs are generated for end users, existing systems often deliver them in rigid or discontinuous formats, lacking the adaptability to match user roles or preserve the natural cadence of speech and interaction.

SUMMARY OF THE DISCLOSURE

In some aspects, the techniques described herein relate to a system for secure data models and synchronization for interactive legacy representation, the system including: at least a processor and a memory communicatively connected to the at least a processor, wherein the memory contains instructions configuring the at least a processor to: receive input data at a knowledge-harvesting engine, generate, using the knowledge-harvesting engine, a structured knowledge object, wherein generating the structured knowledge object includes: extracting a plurality of features from the input data using an extraction pipeline, assigning contextual tags to each feature of the plurality of features using a tagging pipeline, wherein the tagging pipeline is configured to associate each feature with one or more knowledge elements as a function of one or more of semantic, temporal, and relational characteristics of the feature, and encoding paired contextual tags and features of each feature of the plurality of features into the structured knowledge object as fields of a data schema, and store the structured knowledge object in a secure vault data structure implemented in a networked computing environment.

In some aspects, the techniques described herein relate to a method for secure data models and synchronization for interactive legacy representation, the method including: receiving, by at least a processor, input data at a knowledge-harvesting engine, generating, using the knowledge-harvesting engine, a structured knowledge object, wherein generating the structured knowledge object includes: extracting a plurality of features from the input data using an extraction pipeline, assigning contextual tags to each feature of the plurality of features using a tagging pipeline, wherein the tagging pipeline is configured to associate each feature with one or more knowledge elements as a function of one or more of semantic, temporal, and relational characteristics of the feature, and encoding paired contextual tags and features of each feature of the plurality of features into the structured knowledge object as fields of a data schema, and storing, using the at least a processor, the structured knowledge object in a secure vault data structure implemented in a networked computing environment.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 illustrates a networked computing environment configured for interactive legacy representation;

FIG. 6 is a flow diagram of an exemplary method for secure data models and synchronization for interactive legacy.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating, storing, and delivering structured knowledge objects derived from multimodal input data. In an embodiment, a knowledge-harvesting engine processes audio, video, or text inputs to produce structured knowledge objects that can be synchronized across a networked computing environment and one or more companion devices.

Aspects of the present disclosure can be used to preserve contextually rich information in a structured, queryable format. Aspects of the present disclosure can also be used to deliver outputs that adapt to user roles and device capabilities across modalities including text, synthetic voice, and video avatar. This is so, at least in part, because the disclosed systems incorporate contextual tagging, schema-based storage, synchronization pipelines, and output personalization algorithms configured to maintain fidelity and continuity of the underlying information.

Aspects of the present disclosure allow for long-term, interactive access to stored knowledge that maintains alignment with the contextual attributes and values represented in the structured knowledge object. Exemplary embodiments illustrating aspects of the present disclosure are described below in the context of several specific examples.

Figure 1:
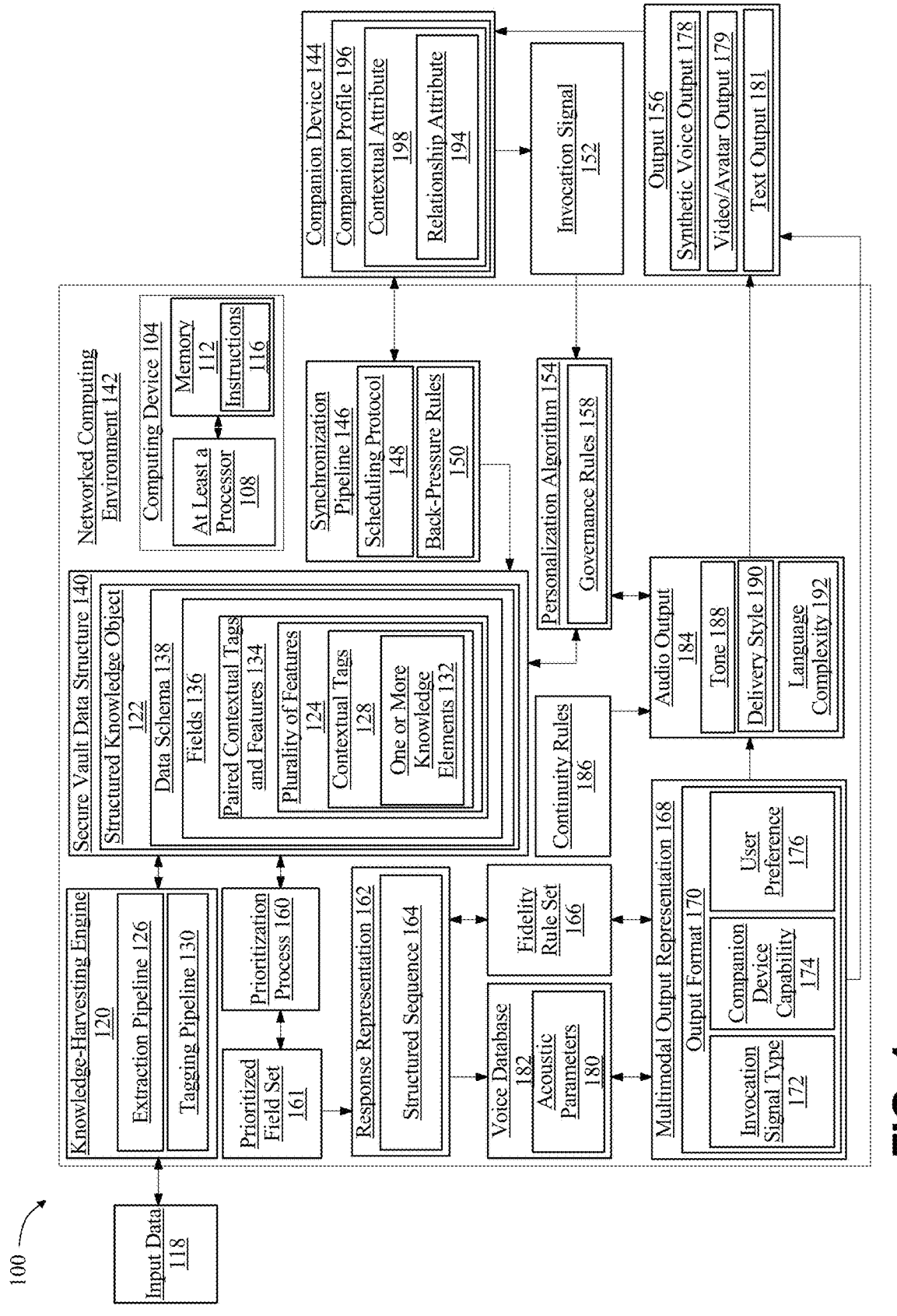
FIG. 1 is a block diagram of an exemplary system for secure data models and synchronization for interactive legacy.

Referring now to FIG. 1, an exemplary embodiment of system 100 for secure data models and synchronization for interactive legacy is illustrated. System 100 may include circuitry such as without limitation at least a processor 108 communicatively connected to a memory 112 containing instructions 116 configured at least a processor 108 to initiate one or more tasks as described throughout this disclosure; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In continued reference to FIG. 1, in an embodiment, at least a processor 108 may be configured to receive input data 118 at a knowledge-harvesting engine 120. In an embodiment, the input data 118 may be related to a represented individual. For purposes of this disclosure, a "represented individual" is a person whose knowledge, values, decisions, and experiences are captured and preserved within the system through the ingestion and structuring of input data 118. In an embodiment, the represented individual may directly contribute input data 118 during their lifetime, for example by responding to questionnaires, recording audio or video statements, or submitting written reflections. In some cases, additional secondary data may be incorporated, such as archived emails, published articles, or social media content, to further enrich the knowledge base. The represented individual is thus distinguished from a "companion user," who interacts with the system through a companion device 144 to access outputs 156 derived from the structured knowledge object 122. By structuring knowledge elements around the represented individual, system 100 may allow personalization algorithms 154, governance rules 158, and multimodal output pipelines to emulate the represented individual's perspective, reasoning style, and communication preferences, thereby enabling interactive legacy representation.

With continued reference to FIG. 1, for purposes of this disclosure, "input data" is any digital content provided to the system. In an embodiment, input data 118 may include unstructured, semi-structured, and/or structured data including but not limited to audio streams, video recordings, text documents, and/or multimodal combinations thereof. Non-limiting examples of input data 118 may include live speech captured through a microphone, recorded video files from a camera, typed entries submitted through a graphical user interface, and/or previously stored digital records such as transcripts, emails, and/or memoranda. In some embodiments, input data 118 may be directly provided by the individual whose knowledge or values are to be represented within system 100. Such direct input may be prompted and/or unprompted, and may include responses to structured questionnaires, answers to targeted interview-style prompts, and/or contributions to open-ended dialogue sessions facilitated by the knowledge-harvesting engine 120. For example, system 100 may present a series of predefined prompts designed to elicit principles or decision-making rationales, and the individual may respond in audio, video, or text form, each of which may be processed as input data 118.

Still referring to FIG. 1, in other embodiments, input data 118 may be indirectly obtained from secondary sources that reflect the digital footprint of the individual. Such secondary or indirect data may include personal writings, published articles, emails, or social media content such as posts, comments, endorsements, or user "likes." In an embodiment, these sources may be accessed through file uploads, data imports, and/or application programming interfaces (APIs) integrated with external platforms. By capturing both directly submitted and indirectly derived information, system 100 can assemble a broader corpus of input data 118 that fully reflects the decision-making style, values, and personal context of the represented individual. In operation, the knowledge-harvesting engine 120 may normalize these different classes of input data 118 to a consistent internal representation. For instance, live speech collected using a microphone may be transcribed and segmented, while a social media post imported using an API may be parsed for semantic units and temporal markers. The normalized content may then be made available for feature extraction, contextual tagging, and structured encoding into the secure vault data structure 140, thereby unifying heterogeneous sources of input into a common pipeline.

With further reference to FIG. 1, in certain embodiments, input data 118 obtained from direct and/or indirect sources may undergo one or more pre-processing operations prior to ingestion by the knowledge-harvesting engine 120. In an embodiment, pre-processing may include tasks such as noise reduction on audio streams, format conversion of video files, optical character recognition (OCR) for scanned documents, language translation, and/or removal of extraneous markup from imported social media posts. In some cases, normalization may further involve temporal alignment of multimodal inputs, conversion of heterogeneous file types into standardized data structures, or tokenization of text content into consistent units. These pre-processing operations may allow system 100 to present the knowledge-harvesting engine 120 with input data 118 that is both syntactically uniform and semantically consistent, thereby improving the accuracy of subsequent feature extraction, contextual tagging, and schema-based encoding. For example, a handwritten note digitized through OCR and a podcast transcript generated through speech-to-text may be normalized into equivalent textual segments before being routed into the extraction pipeline 126.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as discussed further below.

With continued reference to FIG. 1, a near-neighbor analysis may correct errors based on common word pairings. Continuing, the near-neighbor analysis may recognize frequent co-occurrence, such as, "lion and tiger" is generally more common than, "lion and tighter," allowing the OCR to choose the correct phrase. Additionally, and or alternatively, the OCR may process may incorporate grammatical rules of the language being analyzed. For instance, the OCR process may incorporate verb-noun rules. Continuing, the verb-noun rules may assist in identifying sentence structure, enhancing output 156 accuracy. For instance, without limitation, in a sentence like "The eagle flies," the OCR system can use grammatical rules to identify "eagle" as the noun and "flies" as the verb, helping it accurately interpret the phrase rather than misreading "flies" as a noun, which could imply insects. Without limitation, the OCR process may utilize distance measurement techniques, such as the Damerau-Levenshtein distance algorithm.

In continued reference to FIG. 1, in some embodiments, audio input data 118 may undergo pre-processing steps configured to improve clarity and prepare the data for feature extraction. Such steps may include noise reduction, echo cancellation, and segmentation of continuous streams into discrete utterances. Audio signals may also be normalized in amplitude, filtered to remove non-speech frequencies, and/or converted into standardized digital formats such as WAV or MP3 for consistent handling. In certain implementations, speech-to-text conversion may be applied as a pre-processing stage, producing a textual transcript that may be synchronized with time-stamped audio segments. This may allow subsequent operations within the knowledge-harvesting engine 120 to work with both the raw acoustic signal and its textual representation, supporting more accurate semantic analysis.

Still referring to FIG. 1, in some embodiments, video input data 118 may be pre-processed by extracting both visual and auditory components. In some cases, visual pre-processing may include frame rate normalization, resolution adjustment, face and/or speaker detection, and/or motion stabilization to ensure consistency across different recording sources. In an embodiment, audio tracks embedded in video files may be separated and processed using the audio pipeline described above. In certain cases, video inputs may further undergo keyframe extraction or temporal segmentation, producing representative clips that align with semantic events. For example, a recorded lecture may be segmented into clips corresponding to changes in speaker or topic, each clip tagged with time stamps and visual identifiers for ingestion into the knowledge-harvesting engine 120.

In further reference to FIG. 1, in some embodiments, text input data 118 may be normalized through formatting and linguistic processing steps. In an embodiment, pre-processing may include removing extraneous markup (e.g., HTML tags), correcting typographical errors, and/or converting proprietary document formats (e.g., DOCX, PDF) into plain text or structured representations such as JSON or XML. Natural language pre-processing may further include tokenization, stemming, lemmatization, and sentence segmentation to produce consistent linguistic units for feature extraction. In certain implementations, metadata such as document author, creation date, and/or source system may be attached to the text content during pre-processing, enabling downstream modules to contextualize the information when generating structured knowledge objects 122.

With further reference to FIG. 1, in some embodiments, input data 118 derived from secondary sources such as social media and/or published articles may undergo specialized pre-processing to account for the variability of external platforms. In an embodiment, pre-processing may include API-based extraction of content, removal of embedded links and/or advertisements, normalization of emojis or shorthand expressions, and anonymization of unrelated user identifiers. In some cases, posts and comments may be segmented into semantic units, and interaction signals such as "likes" or endorsements may be transformed into relational markers between concepts. In certain implementations, system 100 may map hashtags, categories, or platform-specific tags into standardized contextual tags 128 to ensure compatibility with the knowledge-harvesting engine 120.

Collectively, the foregoing examples illustrate that input data 118 may originate from multiple modalities and, in some cases, undergo pre-processing to achieve a normalized form suitable for downstream analysis. In certain embodiments, the knowledge-harvesting engine 120 may ingest both the pre-processed form of the input data 118 and the raw form of the input data 118. In an embodiment, maintaining both representations may allow system 100 to preserve fidelity across different output modalities, including those that are not exclusively textual. For example, an audio recording may be transcribed and ingested as text for semantic parsing while the raw waveform may be retained for future synthesis in a synthetic voice output 178. Similarly, a scanned handwritten note may be converted into machine-readable text through optical character recognition while the raw image file is preserved to support multimodal outputs that render the original handwriting style. In this manner, system 100 may ensure that the knowledge-harvesting engine 120 is equipped to generate structured knowledge objects 122 without discarding the richness of the original media, enabling later outputs 156 to faithfully reflect the modality in which the input was originally captured.

With continued reference to FIG. 1, for purposes of this disclosure, a "knowledge-harvesting engine" is a computational module configured to transform input data 118 into an intermediate representation suitable for structured encoding. In some embodiments, the knowledge-harvesting engine 120 may include an extraction pipeline 126 including modules for noise reduction, segmentation, transcription, entity recognition, temporal alignment, and/or semantic parsing.

For example, when processing audio input, the knowledge-harvesting engine 120 may first remove background noise, transcribe speech into text, and segment the transcription into discrete utterances. When processing video input, the engine may identify speakers, gestures, and/or temporal markers, while text input may be segmented into phrases or decision statements. In an embodiment, the knowledge-harvesting engine 120 may be communicatively coupled to at least a processor 108 and memory 112 and may operate as an initial stage in producing a structured knowledge object 122 that will ultimately be stored in a secure vault data structure 140. In some cases, features derived from the input data 118 may be routed from the knowledge-harvesting engine 120 to a tagging pipeline 130, which assigns contextual tags 128 that capture semantic, temporal, and relational characteristics. In implementation, system 100 may, for example, receive a recorded statement such as "I value fairness in every business decision," extract "fairness" as a candidate feature, segment the phrase as a principle, and prepare the content for contextual tagging and encoding into the schema of a structured knowledge object 122.

In further reference to FIG. 1, in some embodiments, the knowledge-harvesting engine 120 may be implemented as a standalone module executed on the networked computing environment 142, as a distributed service spanning the companion device 144 and cloud resources, or as an embedded pipeline integrated into specialized hardware. Regardless of the implementation, the knowledge-harvesting engine 120 may function as a transitional stage that bridges heterogeneous input data 118 and the schema-based storage model of the secure vault data structure 140. By generating intermediate representations that are modality-agnostic but semantically rich, the knowledge-harvesting engine 120 may provide a consistent substrate for subsequent contextual tagging, encoding, personalization, and output 156 generation. For example, a transcription derived from an audio recording and a temporal marker derived from a video file may both be represented in the same intermediate format, enabling system 100 to unify multimodal content before assigning contextual tags 128 and encoding the data into structured fields 136.

Still referring to FIG. 1, in further embodiments, the knowledge-harvesting engine 120 may incorporate additional and/or alternative modules depending on the type and complexity of input data 118 being processed. Such modules may include, without limitation, emotion or sentiment detection applied to audio or text, handwriting recognition applied to scanned notes, image classification applied to photographs or diagrams, and/or multimodal fusion modules configured to align features across disparate input streams. These optional modules may operate in parallel or sequentially with the core extraction pipeline 126 and may generate supplementary features and/or annotations that are routed with equal priority into the tagging pipeline 130. In this manner, the knowledge-harvesting engine 120 may remain extensible and adaptable, allowing system 100 to accommodate evolving forms of input data 118 while maintaining consistency in how intermediate representations are produced and subsequently encoded into the structured knowledge object 122.

In continued reference to FIG. 1, in some embodiments, the knowledge-harvesting engine 120 may include an emotion or sentiment detection module configured to analyze vocal tone, word choice, and/or sentence structure in order to infer affective states associated with the input data 118. In an embodiment, the logic of such a module may include supervised classification using labeled datasets that map input signals (e.g., acoustic features, word embeddings) to sentiment categories such as positive, negative, neutral, or context-specific emotional states. In an embodiment, training data may be derived from corpora of annotated speech recordings, text reviews, and/or conversational transcripts in which human raters identify emotional valence or intent. When deployed, the sentiment detection module may output contextual annotations (e.g., "optimistic," "cautious," "emphatic") that become associated tags within the structured knowledge object 122, thereby enriching downstream personalization and output 156 adaptation.

With further reference to FIG. 1, in some embodiments, the knowledge-harvesting engine 120 may incorporate a handwriting recognition module configured to convert handwritten notes or scanned documents into machine-readable representations. In some cases, the logic of the module may involve optical character recognition (OCR) combined with deep convolutional neural networks trained to recognize variations in pen stroke, character shape, and contextual word boundaries. In an embodiment, training data may be drawn from large, annotated handwriting datasets, including both synthetic samples and/or scanned documents containing known ground-truth transcriptions. In deployment, the handwriting recognition module may preserve both the textual content and a pointer to the original image file, enabling system 100 to support multimodal outputs that present either typed text or a reproduction of the original handwritten style.

In some embodiments, the knowledge-harvesting engine 120 may include an image classification module that processes still images or frames extracted from video input. In an embodiment, the image classification module may employ convolutional neural networks and/or vision transformers configured to detect objects, gestures, or visual symbols relevant to the knowledge domain. In some cases, training data may include annotated image corpora where bounding boxes and/or segmentation masks identify regions of interest, such as datasets of human gestures, workplace tools, and/or symbolic diagrams. The resulting classifications may be stored as features and tagged with relational or temporal metadata, allowing downstream modules to link visual context with spoken and/or written statements ingested at the same time.

Still referring to FIG. 1, in some embodiments, the knowledge-harvesting engine 120 may further incorporate a multimodal fusion module configured to align features extracted from different modalities into a unified intermediate representation. In an embodiment, the logic of the multimodal fusion module may leverage attention-based models and/or joint embedding spaces trained on paired datasets that contain synchronized audio, video, and textual streams. For example, training corpora may include lecture videos with transcripts, interview recordings with subtitles, and/or synthetic datasets where audiovisual signals are aligned with semantic annotations. In some cases, the multimodal fusion module may output composite features that integrate vocal tone, spoken content, and facial expressions, enabling more robust contextual tagging and schema encoding. By fusing heterogeneous input streams, the multimodal fusion module may ensure that downstream personalization and output 156 generation reflect the full richness of the original communication rather than a single isolated modality.

With further reference to FIG. 1, in an embodiment, at least a processor 108 may be configured to generate, using the knowledge-harvesting engine 120, a structured knowledge object 122. For purposes of this disclosure, a "structured knowledge object" is a data construct comprising a set of fields organized according to a schema that preserves semantic, temporal, and relational information extracted from input data 118. In some embodiments, the structured knowledge object 122 may represent discrete knowledge elements such as principles, decisions, and/or scenario snippets, each encoded with paired contextual tags and features 134 derived by the knowledge-harvesting engine 120. For purposes of this disclosure, a "principle" is a value-based guideline or rule of conduct that can inform future behavior. For example, the statement "Transparency builds trust" may be encoded as a principle with contextual tags 128 identifying it as a normative value and linking it to interpersonal contexts. A "decision," for purposes of this disclosure, is a discrete choice made in response to a defined circumstance. For example, "I chose to invest conservatively during uncertain markets," which may be tagged with temporal attributes and associated with related principles like risk aversion. For purposes of this disclosure a, "scenario snippet" is a narrative segment or situational example that illustrates how a principle or decision was applied. For example, "When my colleague disagreed, I listened first before responding." In an embodiment, scenario snippets may include temporal markers and relational attributes tying them to both principles and decisions within the structured knowledge object 122.

In continued reference to FIG. 1, in an embodiment, the structured knowledge object 122 may function as the primary unit of storage within the secure vault data structure 140 and provide a normalized format that can be consistently synchronized, queried, and adapted for personalized outputs 156. By separating features (the raw or processed content) from contextual tags 128 (the interpretive metadata), the structured knowledge object 122 may enable downstream processes such as prioritization, validation, and multimodal rendering to operate across heterogeneous inputs in a uniform manner. In implementation, structured knowledge objects 122 may be instantiated as entries in a relational database, as nodes within a graph-based store, and/or as serialized objects in a document-oriented database, depending on system configuration. In an embodiment, each instantiation may further include version markers, lineage metadata, and/or cryptographic signatures to ensure integrity within the networked computing environment 142.

In further reference to FIG. 1, in an embodiment, generating the structured knowledge object 122 may include extracting a plurality of features 124 from the input data 118 using an extraction pipeline 126. For purposes of this disclosure, a "feature" is a unit of information derived from input data 118. In an embodiment, a feature may capture semantic, syntactic, acoustic, visual, and/or temporal attributes suitable for structured encoding. Non-limiting examples of features may include lexical tokens extracted from text, phonemes and/or pitch contours extracted from audio, keyframes and/or gestures extracted from video, and metadata attributes such as timestamps, authorship, and/or document identifiers. In an embodiment, features may be low-level (e.g., word tokens, acoustic frames, image edges) and/or high-level (e.g., recognized entities, identified gestures, and/or inferred sentiment scores), depending on the configuration of the extraction pipeline 126.

With continued reference to FIG. 1, for purposes of this disclosure, an "extraction pipeline" is a sequence of computational processes configured to identify, segment, and transform raw or pre-processed input data 118 into features usable by downstream tagging and encoding stages. In some embodiments, the extraction pipeline 126 may include one or more modules such as tokenizers, entity recognition models, phoneme detectors, and/or frame-segmentation algorithms. For example, in the case of textual input, the extraction pipeline 126 may tokenize a paragraph into sentences, then identify proper nouns as candidate features. For audio input, the extraction pipeline 126 may extract a sequence of phonemes, pitch patterns, and pauses, and align them to a corresponding transcript. For video input, the extraction pipeline 126 may detect visual landmarks such as faces, hands, and/or objects in motion, and assign temporal markers to each detected element.

With further reference to FIG. 1, in some embodiments, the extraction pipeline 126 may be configured as a multimodal pipeline in which different processing paths are applied based on the modality of the input data 118. For instance, audio inputs may be routed through modules for acoustic signal analysis and speech recognition, video inputs may be routed through frame analysis and gesture-detection modules, and text inputs may be routed through tokenization and semantic parsing modules. While each modality-specific branch produces features appropriate to its data type, the branches may ultimately converge at an integration stage of the pipeline, where extracted features are transformed into a unified intermediate representation. In an embodiment, this convergence may ensure that multimodal inputs, such as a video containing both speech and gestures, can be represented in a coherent feature space, enabling downstream tagging and encoding processes to operate on semantically consistent information across modalities.

In continued reference to FIG. 1, in certain embodiments, the convergence stage of the extraction pipeline 126 may further implement synchronization and temporal alignment logic to ensure that features derived from different modalities are properly correlated in time. For example, a spoken phrase identified through an audio branch may be aligned with corresponding mouth movements or gestures identified in the video branch, while both may also be aligned with a transcript generated through a text branch. In an embodiment, the synchronization logic may rely on timestamps, frame indices, and/or sequence alignment algorithms to generate temporal anchors across modalities, thereby maintaining consistency when features are combined into a unified intermediate representation. This temporal alignment may allow system 100 to preserve contextual fidelity, ensuring that downstream tagging and encoding processes can interpret multimodal signals as part of a coherent event rather than as unrelated features.

In further reference to FIG. 1, in an embodiment, the extraction pipeline 126 may serve as the front end of the knowledge-harvesting engine 120, providing standardized feature outputs that can be paired with contextual tags 128 during subsequent processing. In implementation, the extraction pipeline 126 may be realized as a modular software framework in which feature extractors are chained in series or parallel, depending on the data modality and desired resolution. For instance, a recorded statement such as "I always prioritize safety when managing a project" may be processed into features including the lexical token "safety," the identified entity "project," and a temporal marker corresponding to the moment of utterance in the audio stream. These features may then be forwarded to the tagging pipeline 130 for contextual association prior to being encoded into the schema of the structured knowledge object 122.

With continued reference to FIG. 1, in some embodiments, the extraction pipeline 126 may further include a quality control stage configured to validate extracted features prior to forwarding them to the tagging pipeline 130.

In an embodiment, the validation logic may include threshold-based filtering to remove features with low confidence scores, duplication checks to eliminate redundant tokens or frames, and anomaly detection routines to identify features that deviate significantly from expected patterns. For example, an entity recognition model may output multiple candidate names with varying confidence levels, in which case only those exceeding a confidence threshold are retained as features. In another example, a gesture detection module may discard transient false positives caused by background motion. This quality control stage may ensure that only high-fidelity and semantically relevant features progress to contextual tagging, reducing noise in the structured knowledge object 122 and improving the reliability of downstream personalization and multimodal output generation.

In continued reference to FIG. 1, in certain embodiments, validated features may be staged in a buffer or queue prior to being processed by the tagging pipeline 130. In an embodiment, the buffer may operate in a batching mode, in which features are accumulated until a threshold number or time interval is reached, at which point they are released as a group for contextual tagging. Alternatively, the buffer may operate in a streaming mode, in which features are forwarded in near real time as they are validated, supporting low-latency applications such as interactive querying or live session capture. In an embodiment, the queuing mechanism may further include prioritization logic to ensure that features associated with temporal anchors or high-confidence values are processed ahead of less critical features. For example, when processing a video interview, features corresponding to spoken principles may be released immediately for tagging, while background gestures may be queued and processed at a lower priority. In an embodiment, this buffering and queuing stage may provide flexibility in balancing system throughput, latency, and fidelity, ensuring that the tagging pipeline 130 receives a consistent and appropriately ordered stream of features for contextual association.

Still referring to FIG. 1, in an embodiment, the extraction pipeline 126 may implement modality-specific logic to derive features directly from raw or pre-processed input data 118. For textual input, feature extraction may include tokenizing sentences into words or subword units, identifying syntactic dependencies, and applying named-entity recognition models trained on annotated corpora to detect candidate concepts such as people, organizations, or locations. For audio input, the pipeline may convert waveforms into spectrograms, identify phonemes and/or syllables using acoustic models trained on large speech datasets, and detect prosodic markers such as pauses or emphasis that can later be associated with contextual tags 128. For video input, feature extraction may include sampling frames, applying convolutional neural networks and/or vision transformers trained on gesture or object-recognition datasets, and generating temporal markers that link detected events to a timeline. In an embodiment, each of these extracted features may be formatted into a machine-readable representation that can be consistently interpreted by the tagging pipeline 130, ensuring that the structured knowledge object 122 encodes both the semantic content and contextual characteristics of the original input.

With further reference to FIG. 1, in some embodiments, when the input data 118 comprises text, the extraction pipeline 126 may implement natural language processing techniques to derive features from the textual content. Feature extraction may include tokenizing the text into words, subwords, or characters; performing part-of-speech tagging; and constructing dependency trees that identify grammatical relationships between words. In an embodiment, higher-level features may be derived using named-entity recognition models trained on annotated text corpora to detect concepts such as names, places, or organizations. For example, the sentence "I consulted my mentor before choosing the final strategy" may yield features including the entity "mentor," the action "choosing," and the object "strategy," each tagged with its syntactic role. In an embodiment, these features may then be routed into the tagging pipeline 130 where they can be associated with knowledge elements such as principles or decisions in the structured knowledge object 122.

In continued reference to FIG. 1, in an embodiment, language processing as it occurs throughout this disclosure may be accomplished using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively, or additionally, and with continued reference to FIG. 1, language processing module may be produced using one or more large language models (LLMs). A "large language model," as used herein, is a deep learning data structure that can recognize, summarize, translate, predict and/or generate text and other content based on knowledge gained from massive datasets. Large language models may be trained on large sets of data. Training sets may be drawn from diverse sources including, as non-limiting examples, recorded interviews, conversational transcripts, video lectures, social media posts, personal writings, business records, and unstructured text documents. In certain cases, training sets may further include domain-specific corpora, such as annotated decision logs, organizational communications, or curated archives of principles and scenario-based narratives. Training sets may also be constructed from public or private databases associated with an entity, for example, a collection of professional correspondence or archival family records. In some embodiments, portions of these training documents may be correlated with manually annotated contextual tags 128, such as semantic roles, temporal markers, or relational attributes, to provide ground truth for supervised training. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models May include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, when the input data 118 includes the partial statement "I always try to," system 100 may determine that features such as "act fairly," "listen first," or "prioritize safety" are likely to follow, based on patterns learned from training data and contextual tags 128. A language model within the knowledge-harvesting engine 120 may generate such predictions by ranking possible continuations according to likelihood, semantic alignment, or a prompt parameter derived from the input context. In this case, the model may assign the highest score to "act fairly," lower scores to "listen first" or "prioritize safety," and progressively lower scores to other alternatives. In some embodiments, the model may include an encoder component for representing features and contextual tags 128 of the input data 118, and a decoder component for generating candidate continuations or output sequences that can be stored as part of the structured knowledge object 122.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data 118, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data 118. In the case of natural language processing, input data 118 may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data 118 is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you," with "how" and "are." It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a legacy representation session, such as a prompt entered by a family member, a spoken question captured during an interview, or a snippet of secondary content imported from social media activity. In certain embodiments, non-textual inputs such as audio or video may first be transformed into token sequences or embeddings by modality-specific encoders, allowing the LLM to process multimodal information in a unified tokenized format.

With continued reference to FIG. 1, an LLM may generate at least one annotation as an output. At least one annotation may be any annotation as described herein. In some embodiments, an LLM may include multiple sets of transformer architecture as described above. Output 156 may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a nonlimiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1. in some embodiments, when the input data 118 comprises audio, the extraction pipeline 126 may convert the audio waveform into spectral representations such as Mel-frequency cepstral coefficients (MFCCs) or spectrograms. In an embodiment, acoustic models trained on large speech datasets may then map these representations to phonemes, syllables, or words, while prosodic analysis may detect pauses, emphasis, pitch variations, or speaking rate. Such acoustic and prosodic features may provide cues about intent and delivery style 190 in addition to lexical content. For instance, in the recorded statement "I always emphasize safety," the lexical feature "safety" may be extracted alongside a prosodic feature indicating heightened emphasis. These features may be stored as candidate annotations that can later influence how principles are prioritized or how tone 188 is preserved in synthetic voice outputs 178.

With further reference to FIG. 1, in some embodiments, when the input data 118 comprises video, the extraction pipeline 126 may operate on sampled frames or continuous streams to detect and classify visual events. In an embodiment, convolutional neural networks and/or vision transformer models trained on annotated image and gesture datasets may identify features such as facial expressions, hand gestures, and/or interactions with objects. In some cases, temporal models, such as recurrent neural networks or temporal convolution modules, may track the evolution of gestures or postures across frames to generate temporal features that align with spoken or written content. For example, in a video where a speaker raises a hand while saying "I disagreed with that approach," the pipeline may extract the lexical feature "disagreed" from the audio branch and align it with the gesture feature "raised hand" from the video branch. These combined features may then forwarded to the tagging pipeline 130 as multimodal evidence of a decision-making context.

In continued reference to FIG. 1, in some embodiments, when the input data 118 is derived from indirect or secondary sources such as social media activity, published writings, or digital correspondence, the extraction pipeline 126 may implement specialized parsing logic tailored to those formats. For textual posts, feature extraction may include tokenization and semantic parsing similar to direct text input, while additional modules may normalize platform-specific elements such as hashtags, emojis, or shorthand expressions. In an embodiment, metadata such as timestamps, geotags, and/or interaction counts (e.g., likes, shares, comments) may also be extracted as features, providing relational or temporal context for the content. For published writings or correspondence, features may include identified entities, sentiment cues, and/or recurring thematic keywords. For example, a social media post stating "Excited to collaborate with my new team! #innovation" may yield lexical features "collaborate and team," sentiment features indicating excitement, and a tag feature corresponding to "innovation." In an embodiment, these features may be stored in association with the structured knowledge object 122 and later linked to principles and/or scenario snippets that reflect the individual's values and context.

Still referring to FIG. 1, in an embodiment, generating the structured knowledge object 122 may include assigning contextual tags 128 to each feature of the plurality of features 124 using a tagging pipeline 130. For purposes of this disclosure, a "contextual tag" is metadata that characterizes a feature according to its semantic, temporal, or relational attributes. In an embodiment, the contextual tag may enable the feature to be consistently interpreted across different use cases. For example, in some cases, the tagging pipeline 130 may be configured to associate each feature with one or more knowledge elements 132 as a function of one or more of semantic, temporal, and relational characteristics of the feature. For purposes of this disclosure, a "knowledge element" is a unit of structured meaning derived from the combination of a feature and one or more contextual tags 128. In an embodiment, a knowledge element may represent not just the raw content of an input, but its categorized role, temporal placement, and/or relational connections within the structured knowledge object 122. For example, the phrase "fairness" extracted as a feature may become a knowledge element when tagged semantically as a "principle," temporally as "recurring theme," and relationally as linked to "business decisions." Similarly, the feature "hired additional staff" may become a knowledge element when tagged as a "decision" that occurred "during expansion phase" and is "supported by the principle of teamwork." By structuring features into knowledge elements, system 100 may ensure that downstream processes, including personalization algorithms 154, governance rules 158, and multimodal output generation, can operate on discrete, interpretable units rather than ambiguous raw data.

With further reference to FIG. 1, for purposes of this disclosure, a "semantic contextual tag" is a metadata label that characterizes the meaning or role of a feature independent of its timing or relationships. In an embodiment, semantic tags may include, without limitation, categories such as principle, decision, scenario snippet, entity, and/or action. For example, the phrase "honesty matters" may be tagged semantically as a "principle," while "I invested conservatively" may be tagged as a "decision." For purposes of this disclosure, a "temporal contextual tag" is a metadata label that situates a feature in time or sequence. In an embodiment, temporal tags may identify when a statement occurred, the tense of a phrase, and/or its order relative to other features. For example, in the phrase "During my first leadership role, I emphasized transparency," the tag "first leadership role" may be labeled as a temporal anchor that links the statement to an early career phase. A "relational contextual tag," for purposes of this disclosure, is a metadata label that specifies a connection between two or more features, indicating how they influence or depend on each other. In an embodiment, relational tags may capture causal, hierarchical, and/or associative links. For example, the decision "I delegated tasks" may be relationally tagged as connected to the principle "trust in my team," and both may be linked to the scenario snippet "when deadlines were approaching." In an embodiment, together, semantic, temporal, and relational tags may provide a three-dimensional framework for interpreting features, allowing system 100 to encode knowledge in a way that is meaningful, temporally anchored, and contextually connected.

In further reference to FIG. 1, for purposes of this disclosure, a "tagging pipeline" is a computational sequence configured to receive extracted features from the extraction pipeline 126 as inflow and output knowledge elements annotated with one or more contextual tags 128 as outflow. In an embodiment, the tagging pipeline 130 may include a plurality of modules arranged sequentially or in parallel, each configured to perform a distinct tagging operation. For example, a semantic tagging module may employ a machine-learning classifier trained on annotated corpora of text and transcripts to identify whether a feature corresponds to a principle, decision, and/or scenario snippet. In an embodiment, a temporal tagging module may reference timestamp metadata and/or use natural language tense detection models trained on chronological datasets to identify whether a statement refers to past, present, or future contexts. Further, in some cases, a relational tagging module may implement graph-based encoders trained on conversational and narrative corpora to detect causal or hierarchical relationships between features.

Still referring to FIG. 1, in an embodiment, in implementation, the tagging pipeline 130 may adopt different architectural forms depending on system requirements. In some embodiments, the tagging pipeline 130 may be implemented as a rules-based engine using handcrafted logic trees for domain-specific tagging (e.g., mapping keywords such as "I believe" to principle tags). In other embodiments, the pipeline may be realized as a hybrid machine-learning architecture, incorporating transformer-based encoders for semantic interpretation, recurrent neural networks for temporal alignment, and/or graph neural networks for relational inference. In still further embodiments, the tagging pipeline 130 may support feedback loops in which downstream modules, such as personalization engines, provide reinforcement signals that update tagging accuracy over time. For example, when processing the phrase "I always consulted my mentor before deciding," the pipeline may (i) semantically tag "consulted mentor" as an action, (ii) temporally tag the feature as recurring, and (iii) relationally tag it as influencing the decision "before deciding." The resulting knowledge element, including the paired feature and contextual tags 128, may then be passed downstream for encoding into the structured knowledge object 122.

In continued reference to FIG. 1, in an embodiment, the tagging pipeline 130 may function as an intermediate layer between the extraction pipeline 126 and the schema encoding stage of system 100. The inflow to the tagging pipeline 130 may include the plurality of features 124 extracted by the extraction pipeline 126, such as phrases, entities, gestures, and/or temporal markers. In an embodiment, these features may arrive in either raw form (e.g., tokenized words, segmented utterances) or partially preprocessed form (e.g., normalized text, labeled entities). Within the tagging pipeline 130, the features may be enriched by associating them with contextual tags 128 that define their semantic role, temporal placement, and relational dependencies. In an embodiment, the outflow of the tagging pipeline 130 may include a set of knowledge elements. These knowledge elements may then be passed to the schema encoding stage, where they are encoded into fields 136 of the structured knowledge object 122. By structuring system 100 in this modular way, the tagging pipeline 130 may ensure that downstream storage and personalization processes operate on consistent, annotated units of meaning rather than ambiguous raw features.

With continued reference to FIG. 1, in some embodiments, the tagging pipeline 130 may incorporate a feedback mechanism configured to refine tagging accuracy over time through reinforcement updates. For purposes of this disclosure, "feedback" refers to signals provided by downstream modules or user interactions that evaluate the correctness or utility of assigned tags. For example, if a personalization algorithm 154 consistently emphasizes a particular principle in response to companion device queries, system 100 may generate a reinforcement signal indicating the high relevance of that semantic tag. Similarly, if a governance rule flags an output 156 as inconsistent with contextual integrity, system 100 may generate a corrective signal associated with the underlying tags. In an embodiment, these reinforcement signals may be used to adjust the weighting parameters of machine-learning classifiers within the tagging pipeline 130, retrain relational models on updated linkages, and/or refine rule sets governing temporal annotations. In implementation, feedback may be applied asynchronously, such that tags assigned in prior sessions are revalidated against evolving models, thereby ensuring that knowledge elements encoded in the structured knowledge object 122 remain both accurate and aligned with intended interpretive frameworks.

In further reference to FIG. 1, in an embodiment, reinforcement data used to refine the tagging pipeline 130 may be collected through both explicit and/or implicit feedback channels. Explicit feedback may include, without limitation, direct user inputs, such as confirmations or corrections provided through a graphical interface, where a family member, successor, or system operator affirms whether a tag correctly reflects the intended principle, decision, or scenario snippet. Alternatively, implicit feedback may include, without limitation, interaction metrics captured during system use, such as the frequency with which certain tagged fields 136 are accessed in response to companion device queries, dwell time on a generated output 156, or repeated invocations that target similar contextual tags 128. In some embodiments, governance modules may contribute reinforcement data by flagging outputs 156 that violate consistency constraints, thereby indicating a misalignment in underlying tags. In an embodiment, system 100 may aggregate these feedback signals into reinforcement datasets that are periodically applied to retrain or recalibrate the tagging pipeline 130's classifiers, rule sets, or graph models. In this way, reinforcement data collection may ensure that the tagging pipeline 130 evolves with ongoing use, improving the fidelity of knowledge elements and the reliability of the structured knowledge object 122 over time.

Still referring to FIG. 1, in an embodiment, the operations of the tagging pipeline 130 transform unstructured and/or semi-structured features into knowledge elements that are contextually enriched and ready for persistent storage. By appending semantic, temporal, and relational metadata, the tagging pipeline 130 may ensure that each feature is not only identified but also situated within a broader interpretive framework. In an embodiment, the outflow of the tagging pipeline 130, including these fully annotated knowledge elements, may serve as the direct input to the schema encoding stage. In this subsequent stage, the knowledge elements may be mapped into structured fields 136 of a data schema 138, thereby converting dynamic tagging results into a stable, queryable representation that can be stored, synchronized, and accessed across system 100.

With continued reference to FIG. 1, in an embodiment, generating the structured knowledge object 122 may include encoding paired contextual tags and features 134 of each feature of the plurality of features 124 into the structured knowledge object 122 as fields 136 of a data schema 138. For purposes of this disclosure, a "data schema" is a structured organizational framework. In an embodiment, the data schema 138 may specify the format, type, and relational arrangement of data stored within the structured knowledge object 122. In an embodiment, the data schema 138 may include field types corresponding to semantic classifications (e.g., principle, decision, scenario snippet, entity, action), temporal attributes (e.g., timestamp, life phase, event index), and relational markers (e.g., causal link, hierarchical dependency, or associated context). Non-limiting examples of schema field entries may include: a principle field populated with the feature "fairness," a decision field populated with the feature "hired additional staff," and a relational field linking the decision field to its motivating principle. In some cases, the data schema 138 may further define how knowledge elements are cross-referenced, versioned, and queried. For example, the data schema 138 may specify lineage fields that record when and under what context a principle was introduced, ensuring inheritance across generations or organizational hierarchies. In implementation, the data schema 138 may be realized as a relational database schema, a graph-based data model, or a JSON-based hierarchical object structure, each enabling efficient storage and retrieval. By defining a consistent schema, system 100 mat ensure that knowledge elements are encoded in a uniform manner that supports downstream personalization, synchronization, and multimodal output generation.

With further reference to FIG. 1, in an embodiment, encoding paired contextual tags and features 134 into the structured knowledge object 122 may include a mapping process in which each knowledge element is decomposed into its constituent parts and inserted into the appropriate schema fields 136. For example, a knowledge element comprising the feature "I prioritized transparency," tagged semantically as a "principle," temporally as "recurring theme," and relationally as "linked to team communication," may be encoded by populating (i) a principle field with "transparency," (ii) a temporal field with "recurring theme,"

and (iii) a relational field with a link identifier pointing to the element "team communication." In some embodiments, the mapping process may be rule-driven, where predefined logic ensures that semantic tags are routed to categorical fields 136, temporal tags are routed to timeline fields, and relational tags are stored as edges within a graph structure. In an embodiment, to ensure consistency, the encoding process may also apply validation routines that detect conflicts or redundancies among knowledge elements. For example, if two features are tagged as the same principle but with contradictory temporal attributes, system 100 may flag the discrepancy or resolve it according to predefined prioritization rules. Once validated, the encoded schema entries may be persisted to a secure storage layer, ensuring that each structured knowledge object 122 is both internally coherent and queryable by downstream components such as personalization algorithms 154 and multimodal output pipelines.

In further reference to FIG. 1, in an embodiment, at least a processor 108 may be configured to store the structured knowledge object 122 in a secure vault data structure 140 implemented in a networked computing environment 142. For purposes of this disclosure, a "secure vault data structure" is a protected, persistent storage framework configured to maintain structured knowledge objects 122 with integrity, confidentiality, and controlled accessibility. In an embodiment, the secure vault data structure 140 may include a multi-tier schema defining at least modules, roles, and lineage fields. Modules may partition content into thematic and/or functional categories, such as "principles," "decisions," and "scenario snippets." Roles may define access permissions, such as restricting sensitive principles to family members while exposing general decisions to colleagues. Lineage fields may track the historical provenance of each knowledge element, including when it was introduced, updated, and/or inherited across versions. In an embodiment, security of the vault may be ensured through encryption at rest and in transit, role-based access controls, and audit logs that record all modifications to stored knowledge elements.

In continued reference to FIG. 1, for purposes of this disclosure, a "networked computing environment" is a distributed computational infrastructure in which data and processing resources are accessible through interconnected nodes. In an embodiment, the networked computing environment 142 may include cloud-based platforms, enterprise servers, and/or hybrid on-premises/cloud configurations that support high availability and scalability. In some cases, the secure vault data structure 140 may reside in this environment to enable persistent storage, backup, and synchronization with remote companion devices 144. For example, a structured knowledge object 122 stored in the vault may be simultaneously accessible from multiple user devices, while conflict resolution and version control protocols ensure consistency across the distributed environment. By combining the secure vault data structure 140 with a networked computing environment 142, system 100 may ensure that structured knowledge objects 122 are safeguarded, contextually organized, and ubiquitously accessible for personalization and multimodal output generation.

In further reference to FIG. 1, in an embodiment, the secure vault data structure 140 may include cryptographic integrity markers configured to verify object integrity. For purposes of this disclosure, a "cryptographic integrity marker" is a data artifact generated using a cryptographic function that uniquely represents the state of a digital object at a given point in time. Non-limiting examples of cryptographic integrity markers may include hash values (e.g., SHA-256 digests), digital signatures generated using asymmetric key pairs, message authentication codes (MACs), and/or blockchain-based proof-of-existence tokens. In an embodiment, such markers may enable verification that the content of a structured knowledge object has not been altered, corrupted, or tampered with during storage or transmission. For purposes of this disclosure, "object integrity" refers to the assurance that the structured knowledge object stored within the secure vault data structure remains complete, accurate, and unmodified relative to its original state at the time of ingestion or synchronization. In an embodiment, object integrity may encompass detection of unauthorized modifications, unintended bit-level errors, and divergence between versions of the object maintained across distributed devices. Verification of object integrity may be performed by recalculating or revalidating the associated cryptographic integrity marker and comparing it to the marker stored in or associated with the secure vault data structure. In an embodiment, a successful match may confirm that the structured knowledge object is authentic and intact, whereas a mismatch may indicate potential corruption, tampering, or version drift.

With continued reference to FIG. 1, in an embodiment, the secure vault data structure 140 may include synchronization logic configured to detect and resolve version conflicts across distributed devices of the networked computing environment 142. For purposes of this disclosure, "synchronization logic" is a set of programmed operations and rules that manage consistency of structured knowledge objects across multiple storage instances. In an embodiment, synchronization logic may govern how updates to a structured knowledge object are propagated, validated, and reconciled between the secure vault data structure 140 and one or more companion devices. Such logic may include scheduling protocols for initiating updates, transfer regulation mechanisms (e.g., applying back-pressure when bandwidth or processing limits are reached), and reconciliation procedures that determine how to handle diverging versions. For purposes of this disclosure, a "version conflict" refers to a condition in which two or more distributed copies of a structured knowledge object differ in content, state, or integrity marker, such that they cannot be treated as identical. In an embodiment, version conflicts may arise due to concurrent modifications on different devices, partial synchronization resulting from interrupted transmission, or tampering that produces mismatched cryptographic integrity markers. Resolution of a version conflict may involve selecting the most recent or authoritative version based on metadata such as timestamps or cryptographic lineage, merging compatible changes into a unified object, or applying user-defined or policy-driven conflict resolution rules. By incorporating synchronization logic into the secure vault data structure, system 100 may ensure that structured knowledge objects remain accurate, trustworthy, and consistent across the distributed computing environment 142.

In further reference to FIG. 1, the synchronization logic of the secure vault data structure 140 may be configured to utilize cryptographic integrity markers during update and reconciliation operations across distributed devices. In particular, each structured knowledge object stored in a companion device or in the networked computing environment may be associated with one or more cryptographic integrity markers, which serve as verifiable checkpoints of object integrity. During synchronization, system 100 may compare the integrity markers of corresponding structured knowledge objects to determine whether any divergence has occurred. When integrity markers match, system 100 may validate that the distributed versions of the structured knowledge object are consistent and no further reconciliation is required. In an embodiment, when integrity markers differ, system 100 may invoke a conflict resolution protocol, which may include identifying the most recent valid version based on timestamps, applying user-defined rules for prioritization, or merging compatible updates into a new object instance. By coupling cryptographic verification with synchronization logic, system 100 may ensure that each version of the structured knowledge object maintained across distributed environments remains authentic, tamper-resistant, and reconciled to a single authoritative state.

In further reference to FIG. 1, in an embodiment, the synchronization logic of the secure vault data structure 140 may be configured to generate audit logs and lineage metadata associated with each update, reconciliation, or conflict resolution event. For purposes of this disclosure, "lineage metadata" refers to historical information that records the origin, modification sequence, and verification status of a structured knowledge object. In an embodiment, such metadata may include cryptographic integrity markers, version identifiers, timestamps, device identifiers, and user or policy rules applied during reconciliation. In an embodiment, the audit logs may be stored within the secure vault data structure 140 or in an associated logging subsystem, thereby enabling retrospective verification of synchronization events, detection of anomalous activity, and compliance with governance or regulatory requirements. By maintaining lineage metadata, system 100 may provide a tamper-evident record of how each structured knowledge object evolved over time, thereby enhancing transparency, accountability, and trustworthiness of the stored content across distributed devices of the networked computing environment 142.

Still referring to FIG. 1, in some embodiments, the secure vault data structure 140 may be implemented using specialized database and policy management technologies that directly support the multi-tier schema of modules, roles, and lineage fields. In an embodiment, modules may be realized as logical partitions and/or containerized collections of fields 136 within the database. For example, a document-oriented database may assign separate collections for principles, decisions, and scenario snippets, or a graph database may cluster nodes into module-specific subgraphs. In an embodiment, enforcement of module boundaries may be achieved through schema validation routines that reject entries stored in incorrect partitions and by access policies that restrict cross-module queries unless explicitly authorized. In an embodiment, roles may be enforced through a role-based access control (RBAC) framework integrated into the secure vault data structure 140. In one embodiment, an authentication service may assign each user and/or device a role token at login, such as "family member," "colleague," and/or "administrator." In an embodiment, query requests to the secure vault data structure 140 may then be filtered by a policy engine that validates the role token against role-specific permissions. For instance, a family member role may be authorized to retrieve principles and decisions but not business-sensitive scenario snippets. In some cases, enforcement procedures may include cryptographic signatures on role tokens, automated expiration of access privileges, and/or real-time monitoring of access patterns to detect anomalies. In an embodiment, lineage fields may be implemented using version-tracking mechanisms such as immutable append-only logs or graph-based provenance chains. In some cases, each knowledge element encoded in the vault may be stamped with metadata indicating the creation event, subsequent modifications, and inheritance relationships. For example, when a principle is revised, system 100 may append a new lineage record while preserving prior states for auditability. In an embodiment, enforcement of lineage integrity may include cryptographic hashing of lineage entries, cross-checking of update timestamps, and automated reconciliation routines that detect and flag divergent versions across synchronized instances. Together, these enforcement procedures may ensure that the secure vault data structure 140 not only organizes structured knowledge objects 122 into meaningful tiers, but also provides provable security, fine-grained access control, and reliable historical traceability within the networked computing environment 142.

Still referring to FIG. 1, in an embodiment, at least a processor 108 may be configured to synchronize the secure vault data structure 140 with a companion device 144 using a synchronization pipeline 146. For purposes of this disclosure, a "companion device" is any computing device, distinct from the networked computing environment 142, that is configured to locally access, query, or present portions of a structured knowledge object 122. In an embodiment, a companion device 144 may include, without limitation, a dedicated appliance, a smartphone, a tablet, a laptop, a wearable device, or an augmented-reality headset. For purposes of this disclosure, a "dedicated appliance" is a specialized, single-purpose companion device 144. In some embodiments, the dedicated appliance may include a standalone unit, such as a tabletop display with an integrated microphone and speaker, designed solely for capturing invocation signals 152 and rendering outputs 156. In other embodiments, the appliance may take the form of a home hub with embedded cameras and audio components to facilitate interactive sessions in a domestic environment. In still other embodiments, the appliance may be implemented as a wearable device, such as a pendant or headset, that allows continuous or context-specific engagement with the system by transmitting invocation signals 152 and delivering multimodal outputs. Collectively, such dedicated appliances may enable consistent and secure user interaction with the legacy vault, ensuring that system functionality remains accessible even in cases where general-purpose devices are unavailable or less suitable. In an embodiment, a companion device 144 may store a local instance of at least a portion of the secure vault data structure 140 to support offline functionality, reduced latency in accessing knowledge elements, and/or customized user interactions. For example, a wearable companion device 144 may cache selected principles and associated scenario snippets for immediate voice-activated playback, while a tablet device may support full-text search of locally synchronized decision records.

In further reference to FIG. 1, for purposes of this disclosure, a "synchronization pipeline" is a computational sequence that governs the bidirectional exchange of structured knowledge objects 122 between the secure vault data structure 140 maintained in the networked computing environment 142 and the local instance maintained on the companion device 144. In an embodiment, the synchronization pipeline 146 may be configured to implement scheduling protocols 148 (e.g., periodic synchronization, event-triggered synchronization), enforce back-pressure rules 150 to regulate transfers under bandwidth constraints, and apply conflict resolution routines to reconcile discrepancies between vault and device instances. For purposes of this disclosure, a "scheduling protocol" is a rule or set of rules that determines when synchronization events occur between the secure vault data structure 140 and the companion device 144. In an embodiment, scheduling protocols 148 may include time-based synchronization (e.g., updating every 12 hours), event-driven synchronization (e.g., updating immediately upon addition of a new knowledge element), and/or adaptive synchronization (e.g., varying frequency based on device activity or network conditions). A "back-pressure rule," for purposes of this disclosure, is a constraint mechanism that regulates the rate of data transfer during synchronization to prevent resource exhaustion under limited bandwidth or processing availability. For example, if the companion device 144 is connected through a low-bandwidth mobile network, a back-pressure rule may throttle the update stream by sending only high-priority modules, such as principles, while deferring scenario snippets until bandwidth improves. For purposes of this disclosure, a "conflict resolution routine" is a computational process that detects and resolves discrepancies between different versions of the same knowledge element maintained in the secure vault and the companion device 144. For instance, if a decision record is modified both in the cloud instance and locally on the companion device 144, the conflict resolution routine may apply predefined rules, such as "prefer most recent update" or "merge attributes where non-overlapping," to reconcile the versions. For example, if a knowledge element is updated in the cloud vault but an older version is edited locally on the companion device 144, the synchronization pipeline 146 may detect the conflict, apply a lineage-based reconciliation rule, and update both instances to preserve consistency. A "lineage-based reconciliation rule," for purposes of this disclosure, is a specialized form of conflict resolution that leverages the lineage fields encoded in the structured knowledge object 122. For example, if one instance of a principle indicates version 3 while another instance indicates version 5, the reconciliation rule may select version 5 as the authoritative entry, while preserving version 3 as a historical lineage entry. In some embodiments, lineage-based reconciliation may further support branching logic, allowing divergent updates to be merged into a unified representation that records both modification paths for future auditing. In some cases, the synchronization pipeline 146 may further employ encryption and authentication procedures to ensure secure transfer, thereby maintaining the confidentiality and integrity of knowledge elements during synchronization.

In continued reference to FIG. 1, in an embodiment, the synchronization pipeline 146 may be configured to initiate an update of the secure vault data structure 140 as a function of a scheduling protocol 148. In some cases, the scheduling protocol 148 may be implemented as a delta synchronization protocol, wherein only the differences between the networked instance and the local instance of the companion device 144 are transmitted. In an embodiment, this may include hash checks or version markers to ensure that unchanged knowledge elements are not redundantly updated. In other embodiments, the scheduling protocol 148 may operate in a priority-based manner, where updates relevant to an active query or session are transmitted immediately, while background updates occur according to a longer-term schedule.

With further reference to FIG. 1, in an embodiment, the synchronization pipeline 146 may be configured to regulate transfer of the secure vault data structure 140 by applying back-pressure rules 150 as a function of a constraint condition. For example, when a companion device 144 is connected over a limited-bandwidth channel, the synchronization pipeline 146 may prioritize transfer of higher-value content, such as principles and associated scenario snippets, while deferring less critical modules. In some embodiments, the pipeline may further transmit audio-linked principles before video avatar assets, thereby ensuring that essential semantic content is accessible first, while richer media is synchronized once conditions stabilize.

Still referring to FIG. 1, in an embodiment, the synchronization pipeline 146 may be configured to reconcile discrepancies between versions of the secure vault data structure 140 maintained at the networked computing environment 142 and the companion device 144. In some embodiments, reconciliation may occur after offline caching, wherein a companion device 144 stores recently accessed knowledge elements while disconnected from the network and merges them back upon reconnection. In an embodiment, the reconciliation process may apply conflict resolution routines, including lineage-based reconciliation rules, to select or merge versions in a manner consistent with stored lineage fields. For instance, a device update representing version 3 of a principle may be merged into a cloud instance representing version 5, with the lineage field recording both versions for future auditability.

With continued reference to FIG. 1, in some embodiments, synchronization of the secure vault data structure 140 with a companion device 144 may serve not only to maintain consistency of stored knowledge elements, but also to enable downstream personalization and multimodal output generation. By ensuring that the companion device 144 has access to the most recent principles, decisions, and scenario snippets, system 100 may generate outputs 156 that are contextually relevant to the individual associated with the device and consistent with the governing lineage fields. For example, when a synchronized device receives an invocation signal 152, it may access locally cached knowledge elements that reflect both cloud updates and device-level modifications, ensuring that the personalization algorithm 154 operates on a coherent, up-to-date dataset. Similarly, multimodal pipelines such as synthetic voice generation or video avatar rendering may leverage synchronized assets, allowing outputs 156 to remain faithful to the structured knowledge object 122 while accommodating device-specific capabilities and user preferences 176.

In continued reference to FIG. 1, in some embodiments, the synchronization pipeline 146 may further incorporate security mechanisms to preserve the confidentiality, integrity, and authenticity of the secure vault data structure 140 during transfer between the networked computing environment 142 and the companion device 144. In an embodiment, confidentiality may be maintained through encryption of both data in transit and data at rest on the companion device 144. In an embodiment, transport-layer encryption protocols such as TLS may be applied to all synchronization sessions, while device-level encryption keys may protect locally cached instances of knowledge elements. In an embodiment, integrity may be ensured through the use of tamper-detection techniques, including cryptographic hashing of transferred payloads, checksum verification at the receiving endpoint, and rollback prevention mechanisms to guard against replay attacks. In an embodiment, authenticity may be preserved by requiring mutual authentication between the cloud vault and the companion device 144, for example using certificate-based credentials or hardware-backed secure enclaves. In some cases, the synchronization pipeline 146 may also maintain an audit log of all synchronization events, including metadata specifying the timestamp, initiating device, knowledge elements updated, and lineage versions reconciled. In an embodiment, the audit log may be stored as an immutable append-only ledger, enabling forensic review of synchronization history in the event of a security incident. Together, these security measures may ensure that synchronization not only maintains consistency of knowledge elements across distributed environments, but also prevents unauthorized access, undetected tampering, or malicious version manipulation.

In further reference to FIG. 1, in some embodiments, the security measures of the synchronization pipeline 146 may be integrated with the role-based access controls of the secure vault data structure 140 to ensure that permissions remain enforced across distributed environments. For purposes of this disclosure, a "role token" is a cryptographically verifiable credential associated with a user or companion device 144 that specifies which modules and fields 136 of the structured knowledge object 122 may be accessed. In an embodiment, during synchronization, role tokens may be transmitted along with knowledge elements, enabling the companion device 144 to enforce access restrictions locally. For example, if a companion device 144 associated with a "family member" role attempts to synchronize both principle and business decision modules, the pipeline may transfer only the principle-related elements, while blocking or redacting restricted decision fields. In some embodiments, role tokens may include expiration times, cryptographic signatures, and device-specific bindings, ensuring that a token cannot be reused by unauthorized entities. Additionally, lineage fields associated with synchronized knowledge elements may record the role under which each synchronization event occurred, thereby creating an audit trail that links access events to specific roles. In this way, synchronization not only preserves the accuracy and currency of knowledge elements across the secure vault and companion device 144 but also ensures that access policies defined at the vault level are continuously enforced, even when knowledge elements are stored or used locally.

With continued reference to FIG. 1, in an embodiment, at least a processor 108 may be configured to receive, from a companion device 144, an invocation signal 152. For purposes of this disclosure, an "invocation signal" is a request initiated at a companion device 144 that triggers access to one or more fields 136 of the structured knowledge object 122. In some embodiments, an invocation signal 152 may be expressed as a natural language query, such as a typed question or spoken utterance ("What guided your leadership style?"). In other embodiments, an invocation signal 152 may take the form of a structured command or event trigger, such as a button press, a menu selection, or an API call from a secondary application. In some cases, an invocation signal 152 may include additional metadata, such as a user identifier, device capability profile, and/or contextual parameters (e.g., session state, time of day, location), enabling system 100 to process the request in a personalized and context-sensitive manner. In an embodiment, invocation signals 152 may be captured through multimodal input channels supported by the companion device 144. For example, a wearable device may capture voice queries as audio streams, which are transcribed and packaged as invocation signals 152. A tablet interface may allow typed prompts and/or form-based selections to be submitted as invocation signals 152. In still further embodiments, invocation signals 152 may be generated implicitly, such as when a companion device 144 detects a recurrent behavior pattern or automatically invokes an update request during a scheduled interaction. Regardless of form, the invocation signal 152 may serve as the entry point for downstream operations including schema access, personalization algorithms 154, and multimodal output generation.

With further reference to FIG. 1, in an embodiment, upon receipt of an invocation signal 152, at least a processor 108 may be configured to parse the signal to determine its intent and map it to relevant fields 136 of the structured knowledge object 122. Parsing may include tokenizing the input, normalizing terms, and applying natural language processing or pattern-matching techniques to extract one or more invocation features representative of the request. For example, in response to the spoken query "Tell me about your approach to teamwork," at least a processor 108 may extract "approach" as an action keyword, "teamwork" as a semantic entity, and classify the overall query intent as a request for principles and decisions associated with collaboration. In some embodiments, parsing may further incorporate contextual metadata included with the invocation signal 152, such as the role of the requesting user, device capability profile, and/or temporal context, allowing system 100 to disambiguate between similar requests. In some cases, the parsing process may also include alignment with contextual tags 128 assigned during earlier stages of knowledge element creation. For example, if the invocation signal 152 references a temporal phrase such as "early in your career," system 100 may map the request specifically to fields 136 tagged with temporal attributes corresponding to early life phases. Similarly, relational tags may be leveraged to broaden or narrow the scope of the response. By structuring invocation signal 152 parsing in this manner, system 100 may ensure that downstream personalization and output 156 generation are based on an accurate and contextually anchored interpretation of the user's request.

In further reference to FIG. 1, in some embodiments, system 100 may include a parsing module configured to transform an invocation signal 152 into a structured request that can be interpreted by at least a processor 108. For purposes of this disclosure, a "parsing module" is a computational component that receives an invocation signal 152 in raw form and produces a normalized representation of the request. In one embodiment, the parsing module may incorporate one or more machine-learning models, including natural language understanding (NLU) classifiers, large language models (LLMs), and/or domain-specific sequence-to-sequence models trained on annotated conversational datasets. For example, an LLM may be trained to detect intent ("request principle"), extract entities ("teamwork"), and classify context ("early career phase") from a free-form text query. In another embodiment, lightweight classifiers may be applied in parallel with LLMs to validate extracted features or apply domain-specific logic.

With continued reference to FIG. 1, in an embodiment, the parsing module may employ a multimodal preprocessing stage similar to the extraction pipeline 126 described for knowledge harvesting. In an embodiment, audio inputs may be transcribed into text using automatic speech recognition, while video inputs may be processed through frame-level analysis or gesture recognition models to extract textual or symbolic tokens representing the request. In some cases, images, such as handwritten notes or scanned documents, may be processed through optical character recognition to yield text suitable for downstream parsing. In an embodiment, these modality-specific preprocessing operations may converge to produce a uniform text-based or token-based representation of the invocation signal 152, enabling consistent handling by the parsing module regardless of input type. By employing both machine-learning architectures and multimodal preprocessing, the parsing module may ensure that invocation signals 152 of diverse forms are consistently interpreted and formatted into requests compatible with schema access, personalization algorithms 154, and multimodal output 156 generation.

In further reference to FIG. 1, in an embodiment, at least a processor 108 may be configured to access one or more fields 136 of the data schema 138 of the structured knowledge object 122 as a function of the invocation signal 152 and a personalization algorithm 154. For purposes of this disclosure, a "personalization algorithm" is a computational process configured to tailor the system's response to the identity, role, or context of the user associated with a companion device 144. In some embodiments, the personalization algorithm 154 may apply adaptation logic that selects which fields 136 of the data schema 138 are relevant to the parsed invocation signal 152 based on contextual metadata such as user role, session state, and/or device capability. For example, when a child submits an invocation signal 152 asking "How did you make tough choices?", the personalization algorithm 154 may prioritize principle-related fields tagged as "guidance for younger audiences." In contrast, when the same invocation signal 152 is submitted by a colleague role, the algorithm may emphasize decision and scenario snippet fields tagged with "business context." In an embodiment, the personalization algorithm 154 may operate as an intermediate layer between invocation parsing and schema access, ensuring that system 100 retrieves knowledge elements that not only match the semantic content of the signal but are also framed in a way that is aligned with the intended audience or usage context.

Still referring to FIG. 1, in some embodiments, the personalization algorithm 154 may be implemented in multiple tiers. At a high level, a generic personalization algorithm 154 may be applied that adapts system outputs 156 based on broad attributes such as age and/or relationship to the represented individual, and/or audience role. For example, when a grandchild invokes system 100, the personalization algorithm 154 may select principle-oriented fields expressed with simplified tone 188 and explanatory context, while when an executive colleague invokes system 100, the personalization algorithm 154 may select decision-oriented fields presented in professional terminology. In other embodiments, a personalized adaptive algorithm may be employed, configured to refine its behavior based on accumulated interaction data. In an embodiment, during the lifetime of the represented individual, the adaptive algorithm may be trained on observed dialogues, question-answer patterns, and feedback to build a model of preferred communication styles. After the represented individual has passed, the adaptive algorithm may continue to evolve during inference by incorporating feedback and usage patterns from ongoing interactions with successors, family members, and/or colleagues. In this way, the personalization algorithm 154 may support both consistent role-based adaptation and dynamic, relationship-specific growth, allowing system 100 to preserve the character and values of the represented individual while maintaining responsiveness to the needs of living users over time.

With further reference to FIG. 1, in some embodiments, adaptive personalization may be implemented through machine-learning techniques that update model parameters or embeddings in response to user interactions. For example, reinforcement learning loops may be employed, wherein each invocation signal 152 and subsequent feedback event generates a reward datum that adjusts the weighting of schema fields 136 selected for future outputs 156. In other embodiments, system 100 may maintain companion-profile embeddings that capture patterns of interaction associated with a specific user or group of users. In an embodiment, these embeddings may be fine-tuned over time, either locally on the companion device 144 and/or within the networked computing environment 142, to reflect evolving conversational preferences, tone sensitivities, and/or content emphasis. In still further embodiments, adaptive personalization may employ continual learning methods that integrate new interaction data without overwriting core models, thereby preserving the foundational communication style of the represented individual while allowing incremental updates. For example, if a successor consistently requests elaboration on principles tagged with "leadership," system 100 may increase the weighting of such fields 136 when generating outputs 156 for that successor, effectively tailoring responses in a way that simulates an ongoing relationship.

In continued reference to FIG. 1, in an embodiment, the personalization algorithm 154 may include governance rules 158. For purposes of this disclosure, "governance rules" are computational policies that control how knowledge elements encoded in the structured knowledge object 122 are selected, filtered, or transformed prior to presentation at a companion device 144. In an embodiment, governance rules 158 may be implemented as rule sets, policy engines, and/or machine-learning models trained to enforce consistency, sensitivity, and/or ethical boundaries in system responses. In an embodiment, the governance rules 158 may be configured to govern accessibility of the one or more fields 136 of the data schema 138 as a function of a contextual attribute 198 of a companion profile 196 and the paired contextual tags and features 134 of the structured knowledge object 122. For purposes of this disclosure, "accessibility" refers to the degree to which one or more fields 136 of the data schema 138 are available for retrieval or use in response to an invocation signal 152. Accessibility may be binary (e.g., permit or deny access to a field), role-based (e.g., principles visible to family members but not colleagues), or graduated (e.g., content redacted, summarized, or reframed based on context). For example, a governance rule may restrict access to scenario snippets involving sensitive business decisions when the invocation signal 152 is submitted by a minor, while allowing a principle-level summary to remain accessible. For purposes of this disclosure, a "contextual attribute" is a metadata element associated with a companion profile 196 that informs governance rules 158 about the situational context of the invoking user. For example, contextual attributes 198 may include role (e.g., child, colleague, grandchild), age range, relationship type, geographic location, or even interaction history. In some embodiments, contextual attributes 198 may be derived dynamically from invocation signal 152 metadata, such as device identifiers and/or session state. In an embodiment, governance rules 158 may combine contextual attributes 198 with paired contextual tags and features 134 of the structured knowledge object 122 to determine accessibility. For example, a governance rule may detect that a requesting user is a "colleague" and filter out relational tags linked to "family matters," while prioritizing scenario snippets tagged as "business context." By embedding governance rules 158 in the personalization algorithm 154, system 100 may ensure that outputs 156 remain both relevant to the audience and consistent with the ethical or privacy expectations of the represented individual.

In further reference to FIG. 1, in an embodiment, governance rules 158 may be enforced through multiple modes of control, each configured to adapt the accessibility of schema fields 136 to the requesting context. In an embodiment, a first mode of enforcement may include redaction, wherein sensitive details within a field are hidden or masked prior to output. For example, a scenario snippet describing a financial decision may be redacted to remove proprietary figures when accessed by a colleague role. In an embodiment, a second mode may include substitution, wherein system 100 replaces sensitive content with a more general summary. For instance, instead of presenting "I invested in Company X," system 100 may substitute "I pursued a conservative investment strategy." In an embodiment, a third mode may include tone-shifting, wherein the phrasing of accessible content is adjusted to suit the audience; for example, a principle about "resilience in hardship" may be reframed in simpler language when the contextual attribute 198 indicates a child as the recipient. In an embodiment, a fourth mode may include denial, wherein system 100 blocks access entirely to one or more fields 136 and returns a generic response, such as "This information is not available for this type of query." In some implementations, governance enforcement may further be hierarchical, applying multiple modes simultaneously. For example, a governance rule could redact a portion of a decision, substitute the remaining text with a higher-level summary, and apply tone-shifting to simplify phrasing, all before the output 156 is generated. By supporting layered enforcement, system 100 may provide fine-grained control over how knowledge elements are exposed, ensuring both protection of sensitive content and delivery of contextually appropriate outputs 156.

With continued reference to FIG. 1, in some embodiments, governance rules 158 may be dynamically updated to reflect changes in contextual attributes 198, evolving relationships, and/or accumulated feedback from system interactions. For purposes of this disclosure, "dynamic updating" refers to the ability of the system to modify governance policies in real time or over successive sessions without requiring complete reconfiguration. For example, if a companion profile 196 associated with a "child" contextual attribute 198 ages into an "adult" attribute, governance rules 158 may automatically expand accessibility from principle-only fields to include selected decision fields. In other embodiments, governance rules 158 may adapt based on accumulated interaction history, such as granting greater access to scenario snippets when a user demonstrates consistent engagement with related principles. In an embodiment, dynamic updating may also occur through feedback loops where successors, administrators, and/or governance modules provide explicit signals confirming or rejecting the appropriateness of outputs 156. In an embodiment, these signals may be used to retrain machine-learning models underlying the governance engine or to adjust thresholds within rule-based policies. For instance, if outputs 156 tagged as "sensitive" are consistently confirmed as acceptable by a designated administrator, the rule set may relax restrictions for that contextual attribute 198. Conversely, repeated rejection signals may trigger stricter enforcement or automatic redaction. In this way, governance rules 158 may evolve with usage, ensuring that system 100 maintains fidelity to the intent and privacy expectations of the represented individual while remaining flexible to the needs of living users.

With further reference to FIG. 1, in an embodiment, governance rules 158 may operate in conjunction with the personalization algorithm 154 to determine both the selection and the presentation of fields 136 from the structured knowledge object 122. In an embodiment, personalization may be understood as the tailoring of content to align with the requesting user's contextual attributes 198, such as age, relationship, or role, while governance may be understood as the enforcement of policies that limit or reshape content to maintain ethical, privacy, or contextual integrity. In an embodiment, the personalization algorithm 154 may first identify one or more candidate fields from the data schema 138 that correspond to the parsed invocation signal 152. Governance rules 158 may then be applied to those candidate fields, filtering, redacting, substituting, and/or tone-shifting outputs 156 as needed before final assembly. For example, if the personalization algorithm 154 selects a scenario snippet describing a sensitive negotiation, governance rules 158 may redact specific company names or financial amounts before passing the content downstream. In some cases, governance rules 158 may also feed back into personalization, constraining how the algorithm prioritizes or weights schema fields 136 in subsequent invocations. For example, if governance consistently denies access to a category of relational tags for a given contextual attribute 198, the personalization algorithm 154 may learn to deprioritize those fields 136 during selection. By structuring system 100 in this layered manner, system 100 may ensure that outputs 156 remain simultaneously relevant to the requesting user and compliant with policies that safeguard the integrity and ethical boundaries of the represented individual's knowledge.

Still referring to FIG. 1, in an embodiment, at least a processor 108 may be configured to generate an output 156 formatted as a function of one or more accessed fields 136. For purposes of this disclosure, an "output" is a rendered digital artifact that conveys knowledge elements in a form consumable by a companion device 144. In some embodiments, the formatting of the output 156 may include transforming schema fields 136 into natural language sentences, audio waveforms, and/or video segments. For example, a principle field tagged with "fairness" may be formatted as a text-based response such as "I have always valued fairness in decision-making," while a decision field tagged with "hired additional staff" may be formatted into an audio or video output contextualized by its associated principle. In some cases, formatting may also include device-specific adjustments, such as generating simplified text for low-resolution displays, audio responses for hands-free devices, and/or multimodal responses combining voice and visual cues for augmented-reality devices or virtual avatars. By formatting outputs 156 as a function of accessed fields 136, system 100 may ensure that each invocation signal 152 produces a response aligned not only with the structured knowledge object 122 but also with the technical constraints and presentation capabilities of the companion device 144.

With further reference to FIG. 1, in an embodiment, generating the output 156 may include mapping the invocation signal 152 to the one or more accessed fields 136 as a function of the paired contextual tags and features 134 of the structured knowledge object 122. In this context, "mapping" refers to the process of aligning parsed elements of the invocation signal 152 with schema fields 136 that contain semantically, temporally, or relationally relevant knowledge elements. In one embodiment, at least a processor 108 may compare invocation features, such as extracted entities, action keywords, or temporal markers, to contextual tags 128 stored in the structured knowledge object 122. For example, if the invocation signal 152 contains the phrase "early in your career," system 100 may map the request to fields 136 tagged with a temporal attribute corresponding to an early life phase. Similarly, a query containing "how did you make decisions about risk?" may be mapped to decision fields tagged with both "risk" as a semantic attribute and "principle of caution" as a relational tag. In some cases, the mapping process may include a scoring function that ranks the relevance of candidate fields based on the degree of overlap or similarity between invocation features and contextual tags 128. For example, a semantic similarity model may compute vector distances between the invocation phrase "working with teams" and schema fields 136 tagged with "collaboration," elevating those fields 136 as highly relevant. In other embodiments, mapping may be rule-based, such as requiring exact matches for temporal tags or lineage markers. By employing both contextual tags 128 and features in this mapping process, system 100 may ensure that outputs 156 are grounded in the structured knowledge object 122 and directly responsive to the intent and context expressed in the invocation signal 152.

In further reference to FIG. 1, in an embodiment, mapping the invocation signal 152 to the one or more accessed fields 136 may further account for latent semantic associations between features, even in cases where the explicitly accessed fields 136 do not directly contain the requested content. For purposes of this disclosure, a "latent semantic association" is an implicit relationship inferred from recurring patterns of contextual tags 128 across multiple knowledge elements. For example, if a represented individual consistently linked the principle of "fairness" to decisions involving business negotiations, then a query directed to "business strategy" may cause system 100 to elevate fairness-related elements, even if fairness is not explicitly mentioned in the invocation signal 152. In this way, system 100 may emulate the personality or characteristic reasoning style of the represented individual by propagating semantic features that influence downstream response generation. This may ensure that outputs 156 preserve continuity with the represented individual's distinctive values and perspectives, rather than functioning as isolated fragments of information.

In continued reference to FIG. 1, in an embodiment, generating the output 156 may include applying a prioritization process 160 to the one or more accessed fields 136. For purposes of this disclosure, a "prioritization process" is a computational routine that orders or weights accessed fields 136 of the structured knowledge object 122 according to predefined criteria, algorithmic rules, or learned models. In an embodiment, the prioritization process 160 may operate by assigning scores to fields 136 based on contextual tags 128, invocation signal 152 content, and governance rules 158, and then elevating higher-scored fields 136 into the response representation 162 pipeline. For example, applying the prioritization process 160 to the one or more accessed fields 136 may elevate a first set of fields associated with contextual tags 128 representing principles relative to a second set of fields associated with contextual tags 128 representing decisions and a third set of fields associated with contextual tags 128 representing scenario snippets. This may ensure that outputs 156 reflect the foundational values of the represented individual before illustrating concrete choices or situational anecdotes. In some implementations, the prioritization process 160 may use heuristic scoring functions (e.g., fixed weight multipliers for principles), machine-learning models trained on prior invocation-response pairs, and/or reinforcement learning methods that adjust weightings based on user satisfaction signals. By structuring outputs 156 according to this tiered prioritization, system 100 may ensure that outputs 156 remain both contextually relevant to the invocation signal 152 and faithful to the enduring values of the represented individual.

Still referring to FIG. 1, in an embodiment, the prioritization process 160 may dynamically adjust based on the content of the invocation signal 152. For example, if the companion device 144 issues an invocation signal 152 such as "How would you handle a leadership conflict?," system 100 may first identify and elevate fields 136 tagged as principles related to "fairness" and "trust," assigning them higher weights than concrete decision records or situational anecdotes. In an embodiment, once these principle-oriented fields are selected, the prioritization process 160 may next include decision fields such as "delegated responsibility to resolve disputes" and then scenario snippets like "during my first leadership role, I created a mediation process." By ordering the accessed fields 136 in this manner, the prioritization process 160 may ensure that the generated output 156 not only responds directly to the query but also reflects the represented individual's guiding values, thereby emulating their personality and decision-making framework.

With further reference to FIG. 1, in some embodiments, the prioritization process 160 may be implemented using threshold- or score-based logic. For example, each field of the structured knowledge object 122 may be assigned a score as a function of its contextual tags 128, the relevance of those tags to the invocation signal 152, and any applicable governance rules 158. A threshold may then be applied such that only fields 136 exceeding a minimum score are included in the response representation 162, while those below the threshold are deprioritized or excluded. In some cases, hierarchical thresholds may be established, such as requiring a principle-related field to meet only a base score, while a scenario snippet must exceed a higher score to ensure it adds sufficient value. In an embodiment, this scoring and thresholding framework may provide a predictable, rule-based mechanism for ensuring that outputs 156 consistently elevate high-value content without overwhelming the companion device 144 with tangential or low-utility data.

In continued reference to FIG. 1, in other embodiments, the prioritization process 160 may be implemented using a machine-learning model trained to weight fields 136 dynamically. For example, a neural ranking model may be trained on historical invocation-response pairs, where training data includes invocation signals 152, accessed field sets, and satisfaction outcomes provided by test users or logged from system usage. In an embodiment, training sets may include queries such as "What guides your business philosophy?" paired with positive responses emphasizing principle fields, while negative responses may occur if decisions or snippets dominate the answer. In an embodiment, the model may learn to recognize patterns in semantic, temporal, and relational tags that correlate with satisfying outputs. In some cases, reinforcement learning may be employed, where the model iteratively updates weightings based on reward signals such as engagement duration or explicit user ratings. By employing trained models, system 100 may adapt prioritization logic over time, refining its ability to reflect the represented individual's values while meeting the expectations of diverse companions.

With continued reference to FIG. 1, in some embodiments, the prioritization process 160 may further leverage the semantic, temporal, and relational contextual tags 128 assigned during feature extraction and tagging. For example, semantic tags may serve as primary determinants of weighting, such that principles receive a higher base score than decisions or scenario snippets. In an embodiment, temporal tags may further modulate prioritization, enabling system 100 to elevate more recent decisions in response to time-sensitive invocation signals 152 while still anchoring the response to enduring principles. Relational tags may also influence weighting by linking features together, such that a scenario snippet directly tied to a principle is elevated above a snippet without strong relational support. In this way, the prioritization process 160 may not treat fields 136 in isolation but instead evaluate them within the broader semantic, temporal, and relational framework defined in the structured knowledge object 122, ensuring that outputs 156 remain contextually grounded and reflective of both the represented individual's values and the circumstances in which those values were applied.

With further reference to FIG. 1, in an embodiment, generating the output 156 may include generating a response representation 162 as a function of a prioritized field set 161. For purposes of this disclosure, a "response representation" is an intermediate object that organizes and encodes selected knowledge elements into a coherent form prior to final rendering for presentation at the companion device 144. In some embodiments, the response representation 162 may include metadata specifying sequence, modality, and formatting rules so that downstream modules can generate text, audio, and/or video outputs consistently. For purposes of this disclosure, a "prioritized field set" is the subset of fields of the data schema 138 that have been elevated through the prioritization process 160. For example, principles ranked above decisions and scenario snippets. In an embodiment, generating the response representation 162 may include assembling content from the prioritized field set 161 into a structured sequence 164 configured for presentation to the companion device 144. For purposes of this disclosure, "content" refers to the substantive material encoded within a field. For example, content may include, but is not limited to textual phrases, semantic tags, associated audio clips, and/or linked video segments. A "structured sequence," for purposes of this disclosure, is an ordered arrangement of content elements and metadata that specifies the logical flow of information, such as cause-effect orderings, chronological progressions, and/or emphasis hierarchies. For example, if an invocation signal 152 relates to "leadership advice," the response representation 162 may include a structured sequence 164 that begins with a principle such as "trust your team," follows with a decision field like "delegated responsibilities during high-pressure projects," and concludes with a scenario snippet illustrating the application of these ideas.

In continued reference to FIG. 1, in some embodiments, the response representation 162 may function as an intersectional layer between knowledge encoding and final delivery, serving as a modality-agnostic construct from which multiple output 156 paths may diverge. Unlike the final output, which is rendered in a specific format such as text, synthetic voice, or video avatar, the response representation 162 may preserve the selected content and structured sequence 164 in a form that can be flexibly adapted to any of these modalities. For example, a single response representation 162 containing the structured sequence 164 "principle, decision, scenario snippet" may be rendered as text displayed on a graphical interface, synthesized into speech using acoustic parameters 180 of the represented individual's voice, or animated through a video avatar pipeline. By separating the response representation 162 from the final output 156, system 100 may allow personalization algorithms 154, governance rules 158, and companion device 144 preferences to be applied consistently before committing to a modality-specific rendering. This architecture may ensure that the same core knowledge is consistently expressed across different formats, while enabling dynamic adaptation to user needs, device capabilities, and contextual requirements.

Still referring to FIG. 1, in an embodiment, assembling the response representation 162 into a structured sequence 164 may involve sequencing logic that interprets relationships among the prioritized field set 161, their paired contextual tags 128, and associated content. In some embodiments, system 100 may apply ordering rules derived from semantic hierarchies (e.g., presenting principles before decisions and scenario snippets), temporal anchors (e.g., positioning more recent events after earlier ones), and/or relational connections (e.g., clustering features that share a causal or associative link). In certain cases, system 100 may employ graph-based traversal techniques, wherein nodes correspond to knowledge elements and edges correspond to relational tags, allowing at least a processor 108 to generate a path through the graph that yields a coherent narrative flow. In an embodiment, metadata encoded within the response representation 162 may further define modality (text, audio, video) and formatting, enabling downstream modules, including the multimodal output pipeline and validation processes, to render the sequence appropriately for the companion device 144. For example, the phrase "I always valued fairness," tagged semantically as a principle, may be sequenced ahead of the decision "implemented transparent salary bands," which in turn precedes the scenario snippet "during annual reviews," resulting in a structured sequence 164 that is both logically consistent and contextually faithful to the represented individual's knowledge.

With further reference to FIG. 1, in an embodiment, the sequencing logic may be realized through a combination of rule-based engines and machine-learning models. In some embodiments, a rule-based engine may apply predefined precedence rules, such as "principles precede decisions" or "decisions precede scenario snippets," encoded as conditional logic in the system's execution layer. In other embodiments, a sequence-generation model, such as a recurrent neural network (RNN), transformer-based architecture, or graph neural network (GNN), may be trained to predict the most coherent ordering of knowledge elements given their semantic, temporal, and relational tags. In an embodiment, training data for such models may include curated narrative sequences drawn from biographies, decision logs, and/or annotated interview transcripts, where human experts have labeled the order in which principles, decisions, and scenarios are presented to maximize clarity and fidelity. In still other embodiments, a hybrid approach may be employed, wherein deterministic rules establish high-level ordering (e.g., principles before decisions), while a learned model optimizes local ordering within a category (e.g., deciding whether to surface early-career vs. late-career principles first). In all cases, the sequencing logic may produce an ordered set of content elements enriched with modality and formatting metadata, which together may form the foundation of the response representation 162.

Still referring to FIG. 1, in an embodiment, sequencing logic may be dynamically adapted as a function of the type or intent of the invocation signal 152 received from the companion device 144. For example, if the invocation signal 152 corresponds to a direct question such as "What should I do in a crisis situation?", the sequencing logic may prioritize decisions or scenario snippets that directly address the requested context, while still linking them back to supporting principles. By contrast, if the invocation signal 152 seeks general guidance, such as "What values guided your leadership?", the sequencing logic may elevate principles to the beginning of the structured sequence 164 and position related decisions or scenario snippets as illustrative examples. In other cases, invocation signals 152 may specify modality or time constraints, prompting the sequencing logic to shorten or reformat the structured sequence 164 to fit within an audio clip length or display window on the companion device 144. By tailoring sequencing strategies to the nature of the invocation signal 152, system 100 may ensure that response representations 162 are not only faithful to the represented individual's knowledge but also optimized for contextual relevance, clarity, and user experience.

In further reference to FIG. 1, in an embodiment, once the sequencing logic has determined the order and contextual relationships among the prioritized field set 161, system 100 may assemble these elements into a unified response representation 162 object. For purposes of this disclosure, "assembly" refers to the process of packaging ordered content elements and their associated metadata into a structured sequence 164 that is encoded as a coherent object. In some embodiments, this assembly process may be implemented using a schema-driven instantiation procedure, wherein each knowledge element is bound to specific slots or fields 136 within a response representation 162 template. In other embodiments, the process may be model-driven, wherein a narrative construction model arranges and encodes the elements dynamically based on contextual optimization. Regardless of implementation, the assembled response representation 162 object may serve as the definitive intermediate form, bridging the prioritized field set 161 with downstream modules responsible for validation and multimodal rendering.

In continued reference to FIG. 1, in some embodiments, schema-driven instantiation may be realized using a data template architecture, where each slot in the template corresponds to a particular category of knowledge element such as principle, decision, or scenario snippet. During assembly, ordered content elements may be inserted into these slots along with their contextual tags 128 and associated metadata, ensuring consistency of representation across different response instances. In an embodiment, the schema may further include placeholder fields for modality parameters, such as whether the element should be rendered as text, mapped to a synthetic voice sample, or paired with a video segment. By enforcing this template-based organization, system 100 may ensure that every response representation 162 object is created in a predictable structure that supports validation, indexing, and efficient downstream rendering.

With further reference to FIG. 1, in other embodiments, model-driven assembly may be employed to dynamically construct the response representation 162 object when more adaptive or context-sensitive behavior is required. For instance, a narrative construction model trained on annotated dialogue sequences may learn to arrange knowledge elements in ways that reflect conversational flow, rhetorical emphasis, or emotional salience. In an embodiment, such a model may take as input the prioritized field set 161, contextual tags 128, and invocation signal 152 metadata, and output a structured sequence 164 that optimizes for coherence, brevity, or personalization. Non-limiting examples of training data for the model may include curated interview transcripts, storytelling corpora, and/or paired examples of input prompts and expert-designed responses. In some cases, hybrid approaches may be used, where a schema provides a structural backbone while the model fine-tunes ordering and phrasing within slots. In all implementations, assembly may additionally log lineage markers and version identifiers within the response representation 162 object, ensuring traceability for governance and enabling rollback or auditing if conflicting assembly strategies are applied.

With continued reference to FIG. 1, in an embodiment, once the response representation 162 has been assembled, system 100 may prepare the response representation 162 for validation prior to committing it to any modality-specific rendering path. For purposes of this disclosure, "validation readiness" refers to the process of marking the response representation 162 as a candidate object for evaluation against governance rules 158, fidelity checks, and personalization constraints. In some embodiments, system 100 may attach validation flags to individual content elements or to the response representation 162 as a whole, indicating which portions require further inspection. For example, principles may be flagged for governance compliance, while scenario snippets may be flagged for contextual alignment with the invocation signal 152. In other embodiments, hash values, version identifiers, or lineage markers may be embedded in the response representation 162 to support integrity verification during the validation process. By formally distinguishing a validation readiness stage, system 100 may ensure that only response representations 162 that meet ethical, contextual, and structural standards are propagated forward into the multimodal output pipeline, thereby reducing the risk of generating non-compliant or inconsistent outputs 156.

Still referring to FIG. 1, in an embodiment, at least a processor 108 may be configured to validate a response representation 162. For purposes of this disclosure, "validation" is a computational process that evaluates whether the response representation 162 conforms to predefined standards of accuracy, integrity, and compliance prior to rendering an output 156. In some embodiments, validation may ensure that the content assembled into the response representation 162 faithfully reflects the structured knowledge object 122 from which it was derived, preventing distortion and/or misattribution of the represented individual's knowledge. In an embodiment, validation may also enforce ethical and contextual safeguards, such as ensuring that sensitive information is not surfaced outside its intended audience or that responses remain aligned with principles encoded during knowledge harvesting. In some cases, validation may be performed automatically by rule-based engines, probabilistic models, or a combination thereof, and may result in the acceptance, rejection, or modification of the response representation 162. By introducing a validation stage prior to multimodal rendering, system 100 may ensure that all generated outputs 156 maintain fidelity to the represented individual and comply with the governance framework defined for the system.

In further reference to FIG. 1, in some embodiments, validation of the response representation 162 may involve multiple categories of checks that operate in parallel or in sequence. For example, a first category may include factual integrity checks, wherein the content of the response representation 162 is compared against canonical knowledge elements stored in the secure vault data structure 140 to confirm that no corruption, truncation, or unauthorized alteration has occurred during sequencing and assembly. Further, a second category may include lineage consistency checks, which may verify that the version identifiers and lineage markers associated with the knowledge elements align with the most authoritative version recorded in the secure vault data structure 140, ensuring that deprecated or outdated content is not unintentionally surfaced. Continuing, a third category may include governance compliance checks, wherein the response representation 162 is evaluated against governance rules 158 and contextual attributes 198 of the requesting companion profile 196 to prevent disclosure of restricted or sensitive material. In an embodiment, additional categories may include formatting validation (ensuring structural adherence to schema specifications) and/or contextual validation (ensuring that the invocation signal 152 is adequately addressed by the assembled response). By layering these categories of checks, system 100 may comprehensively validate response representations 162 across dimensions of accuracy, integrity, and ethical compliance before advancing them to modality-specific rendering.

In continued reference to FIG. 1, in an embodiment, validating the response representation 162 may include comparing one or more fields 136 of the data schema 138 accessed to generate the response representation 162 against a fidelity rule set 166. For purposes of this disclosure, a "fidelity rule set" is a collection of predefined logical, semantic, and contextual constraints that govern whether the content of a response representation 162 accurately and ethically reflects the structured knowledge object 122 and the represented individual's intended meaning. In some embodiments, fidelity rules may include semantic fidelity rules, which may ensure that principles, decisions, and scenario snippets are surfaced only in ways that preserve their categorical meaning (e.g., a principle cannot be presented as a scenario snippet). In an embodiment, other fidelity rules may include temporal fidelity rules, which may confirm that the temporal anchors of a knowledge element (e.g., "early career") are respected during assembly, preventing responses from misrepresenting chronology. Additional fidelity rules may include, without limitation, relational fidelity rules, which may require that linked elements (e.g., a decision supported by a principle) remain paired in outputs 156 rather than being presented in isolation. In certain cases, fidelity rules may also include ethical fidelity rules, ensuring that sensitive, confidential, and/or contextually restricted content is not improperly revealed. By comparing accessed schema fields 136 against this fidelity rule set 166, system 100 may ensure that generated response representations 162 maintain integrity, remain contextually faithful, and safeguard the represented individual's values.

With continued reference to FIG. 1, in an embodiment, the fidelity rule set 166 may be encoded as a combination of deterministic rule engines and adaptive machine-learning models. In some embodiments, deterministic rules may be represented as conditional logic or schema constraints, such as "if field type=principle, then prohibit reclassification as scenario snippet," or "if temporal tag=past event, then prevent rendering as a current recommendation." In an embodiment, these rules may be implemented in structured query languages, constraint satisfaction systems, and/or as executable policies within the validation engine. In other embodiments, fidelity validation may leverage machine-learning classifiers trained to detect distortions, inconsistencies, or ethical violations in candidate response representations 162. Non-limiting examples of training data for such classifiers may include annotated pairs of valid and invalid outputs 156, curated narrative corpora, and domain-specific examples where contextual misrepresentation (e.g., swapping order of cause and effect) is explicitly labeled. In some cases, hybrid validation may be applied, wherein deterministic rules filter for high-confidence violations while machine-learning models evaluate more subjective aspects, such as tone alignment or contextual appropriateness. In an embodiment, the output 156 of this technical process may be a binary validation signal (valid or invalid) or a graded confidence score, which may determine whether the response representation 162 proceeds directly to rendering, is modified, or is rejected.

With further reference to FIG. 1, in an embodiment, validating the response representation 162 may include validating the response representation 162 as a function of comparing the one or more fields 136 against the fidelity rule set 166. In some embodiments, this comparison may be performed field-by-field, wherein each knowledge element in the response representation 162 is matched against its corresponding semantic, temporal, and relational tags stored in the secure vault data structure 140. If a field deviates from the fidelity rule set 166, for example, if a decision field is incorrectly sequenced before a principle or if a temporal tag indicates a misalignment between past and present context, system 100 may flag the inconsistency. In some cases, flagged elements may be automatically corrected through rule-based adjustments, such as reordering a field or reinserting a missing relational link. In other cases, the response representation 162 may be invalidated and regenerated using an alternate prioritization or sequencing path. In certain embodiments, validation may further involve scoring each field against the fidelity rule set 166, with only those response representations 162 achieving a threshold score being permitted to advance to the multimodal output pipeline. By structuring validation as a rule-driven comparison process, system 100 may ensure that each response representation 162 maintains fidelity to the structured knowledge object 122, thereby preserving both the accuracy and the integrity of the represented individual's knowledge.

In continued reference to FIG. 1, in some embodiments, if a response representation 162 fails validation against the fidelity rule set 166, system 100 may initiate a regeneration loop to produce a corrected response. In such cases, at least a processor 108 may return to the sequencing or prioritization stage, adjusting weights, reordering fields 136, or excluding elements that triggered rule violations. For example, if a scenario snippet is surfaced without an associated supporting principle, the regeneration loop may reassemble the response representation 162 to ensure proper relational context. In other embodiments, system 100 may employ fallback strategies, such as reverting to a default template that presents only principles or narrowing the output 156 to a subset of validated content rather than presenting the entire structured sequence 164. In still other cases, system 100 may surface an error-handling routine, transmitting a notification to the companion device 144 that the invocation signal 152 could not be fulfilled due to validation failure, thereby preserving the integrity of the represented individual's knowledge by avoiding the delivery of misleading or incomplete outputs 156. These regeneration and fallback mechanisms may ensure that the validation process operates not only as a safeguard but also as a corrective loop, maintaining reliability and trustworthiness of outputs 156 generated by system 100.

With further reference to FIG. 1, in an embodiment, once a response representation 162 has been validated against the fidelity rule set 166, system 100 may log the validated object into an audit trail prior to rendering. For purposes of this disclosure, an "audit trail" is a persistent record that captures the content, metadata, and validation status of each response representation 162. In an embodiment, the audit trail may enable traceability, accountability, and post hoc review. Further, in some embodiments, the audit trail may include version identifiers of the structured knowledge object 122 fields 136 used, the invocation signal 152 that initiated the output 156, the sequence of prioritization and sequencing decisions applied, and the outcome of each validation check. In some cases, the audit trail may also record governance compliance indicators, such as which fields 136 were excluded or altered to satisfy accessibility constraints. In an embodiment, audit records may be stored within the secure vault data structure 140 and/or in a dedicated logging repository protected by encryption and access controls. In certain implementations, audit logs may be queryable by administrators or authorized users to reconstruct past outputs 156, diagnose validation failures, or evaluate the consistency of the personalization algorithm 154 over time. By embedding logging and auditing into the validation workflow, system 100 may ensures that outputs 156 not only comply with fidelity rules at generation time but also remain verifiable and reviewable throughout the lifecycle of the represented individual's knowledge.

Still referring to FIG. 1, in an embodiment, at least a processor 108 may be configured to generate a multimodal output representation 168 as a function of the invocation signal 152. For purposes of this disclosure, a "multimodal output representation" is a construct that specifies how the response representation 162 is to be expressed across one or more output modalities. In an embodiment, a multimodal output representation 168 may include but is not limited to text, synthetic voice, and video avatar. In some embodiments, the multimodal output representation 168 may serve as a transformation layer that applies modality-specific formatting rules, acoustic or visual parameters, and presentation timing to the validated response representation 162. Unlike the response representation 162, which is modality-agnostic and functions as a structured sequence 164 of knowledge elements, the multimodal output representation 168 may be modality-aware and may be configured for rendering in a specific format. For example, a multimodal output representation 168 may encode line breaks and text styling for a text interface, phonetic markers and prosodic cues for a speech synthesizer, and/or animation directives and facial-mapping parameters for a video avatar. In some implementations, multimodal output representations 168 may be generated in parallel for multiple modalities, allowing the companion device 144 or user preference settings to select the most appropriate format at runtime. In other cases, the user preference settings may inform the path taken in generating the multimodal output representation 168 prior to actual generation of the representation. By introducing this intermediate representation, system 100 may enable flexible, personalized, and device-appropriate delivery of validated content while maintaining consistency with the represented individual's knowledge.

In further reference to FIG. 1, in an embodiment, generating a multimodal output representation 168 may include selecting an output format 170 as a function of one or more of an invocation signal type 172, a companion device capability 174, and a user preference 176. For purposes of this disclosure, an "output format" is a modality-specific specification that determines how validated content is presented. For example, such as plain text, stylized text, synthesized audio, and/or animated video avatar. In some embodiments, system 100 may dynamically choose among these formats depending on the context of the invocation. For purposes of this disclosure, an "invocation signal type 172" is a classification of the kind of request received from the companion device 144. For example, such as a direct question, a general guidance request, or a situational query (e.g., advice under stress), which may influence whether the response is better suited for concise text, naturalistic speech, or expressive video output. For purposes of this disclosure, a "companion device capability" refers to the hardware and software resources available on the requesting device. For example, such as display size and resolution, audio output fidelity, processing power, or network bandwidth. As a further example, a smartphone may be capable of text and audio but not high-resolution avatar rendering, whereas a dedicated companion appliance may support full audiovisual synthesis. For purposes of this disclosure, a "user preference" is a configurable setting or learned behavior that specifies how a particular user or contextual profile prefers to receive outputs 156. In an embodiment, user preferences 176 may include defaulting to voice for hands-free use, text for discreet interactions, or video for immersive experiences, and may be stored locally on the companion device 144 or centrally in the secure vault data structure 140. By considering invocation type, device capability, and user preference 176 together, system 100 may ensure that each multimodal output representation 168 is tailored to both the requesting context and the delivery environment.

With further reference to FIG. 1, in some embodiments, a user at a companion device 144 may explicitly select the output format 170 they are seeking as part of the invocation process. For example, the user may indicate through a graphical interface that they wish to hear the represented individual's voice, prompting system 100 to generate a synthetic audio output 184 rather than a text transcript. Similarly, a user may select a video avatar option to obtain a more immersive, expressive delivery, or may default to text output 181 in environments where audio or video playback is impractical. In an embodiment, format selection may occur through a decision engine that evaluates attributes of the invocation signal type 172, the companion device capability 174, and the user preference 176. In one embodiment, the decision engine may apply a weighted scoring model in which each attribute contributes to a final format score, with the format achieving the highest score being selected for multimodal rendering. For instance, if the invocation signal type 172 indicates an emotional or relational query, user preferences 176 favor audio, and the companion device 144 supports high-fidelity playback, the decision engine may select a synthetic voice output 178. In another embodiment, a rules-based format selector may employ conditional logic, such as "if user preference 176=video and device capability=avatar-capable, then output format 170=avatar." In still other embodiments, machine-learning models trained on historical invocation logs may predict the optimal format by analyzing correlations between request types, device environments, and user satisfaction outcomes. These mechanisms may collectively ensure that output format 170 selection is both technically robust and adaptable to user intent, device limitations, and contextual nuance.

In continued reference to FIG. 1, in an embodiment, the selection of an output format 170 may additionally be a function of the content available within the structured knowledge object 122. For purposes of this disclosure, "content-aware selection" refers to tailoring the output modality to the form in which the represented individual originally provided or emphasized the knowledge. For example, if the invocation signal 152 relates to a principle that was originally captured in the represented individual's spoken voice, system 100 may prioritize rendering the response as a synthetic voice output 178 to preserve authenticity and resonance. Similarly, if a decision was recorded in written form, such as a journal entry or typed memorandum, system 100 may default to text output 181 for accuracy, unless user preferences 176 override this behavior. In other cases, where video clips of the represented individual are available and closely aligned with the requested context, system 100 may elevate the video avatar format to surface that content in its most faithful modality. In an embodiment, this may be achieved by tagging knowledge elements with origin modality metadata during ingestion, which can then be factored into the format selection decision alongside invocation type, device capability, and user preference 176. By integrating content-aware selection, system 100 may ensure that outputs 156 are not only contextually appropriate but also maximally authentic to the original expressions of the represented individual.

With continued reference to FIG. 1, in an embodiment, generating a multimodal output representation 168 may include assembling content from one or more fields 136 of the data schema 138 of the structured knowledge object 122 into the multimodal output representation 168 corresponding to the output format 170. For purposes of this disclosure, "assembling" refers to the process of adapting the validated response representation 162 into a modality-specific configuration that incorporates both the selected content and the formatting rules required for final rendering. Unlike the response representation 162, which remains modality-agnostic, the multimodal output representation 168 may be modality-aware and may encode specific directives for text layout, audio synthesis, or video animation. For example, when the output format 170 is text, the assembly process may apply typographic formatting, line breaks, or emphasis markers to ensure clarity on a display interface. In an embodiment when the output format 170 is audio, the assembly process may map textual content to phonetic transcriptions, prosody markers, and timing cues to drive a speech synthesis module. Further, in an embodiment, when the output format 170 is video, the assembly process may associate fields 136 with avatar animation parameters, gesture mappings, or facial expressions to align the delivery with the cadence and emotional tone of the represented individual. In some embodiments, assembly may further incorporate companion device capability 174 data (e.g., screen size, audio channel limitations) to optimize rendering fidelity. By assembling content into this modality-specific representation, system 100 may ensure that the multimodal output pipeline can efficiently generate an output 156 that is both faithful to the underlying knowledge and optimized for the requesting device.

In further reference to FIG. 1, in an embodiment, the assembly of a multimodal output representation 168 may be achieved through either template-based procedures, model-driven generation, or a hybrid of both. In a template-based procedure, system 100 may apply predefined modality templates that dictate how fields 136 are inserted and formatted for a given output type. For example, a text template may include slots for a principle, decision, and scenario snippet with rules for headings, paragraph breaks, or emphasis markers. In an embodiment, an audio template may define phonetic transcription slots, prosody control markers, and pauses, while a video template may specify animation layers, lip-synchronization mappings, and gesture libraries. In contrast, model-driven assembly may employ neural sequence-to-sequence models or multimodal transformers trained to adapt validated content into expressive outputs 156. For instance, a model may learn to translate text into natural prosody for speech synthesis or align scenario snippets with avatar gestures in video outputs. In an embodiment, hybrid approaches may combine these methods, where a schema-driven template enforces consistency across modalities, and a generative model optimizes tone 188, rhythm, or visual alignment for personalization. Regardless of approach, assembly into the multimodal output representation 168 may ensure that downstream rendering modules receive a fully specified, modality-tailored input that can be deterministically transformed into final output 156 at the companion device 144.

Still referring to FIG. 1, in an embodiment, at least a processor 108 may be configured to generate an output 156 for presentation at the companion device 144 as a function of the multimodal output representation 168. Unlike the response representation 162 or the multimodal output representation 168, which are intermediate digital constructs, the output 156 is the terminal form that completes the processing pipeline and directly interfaces with the user. For purposes of this disclosure, "presentation" refers to the delivery and rendering of the output 156 on the companion device 144 in a manner consistent with its hardware and software capabilities. For example, presentation of text output 181 may involve drawing formatted characters in a user interface; presentation of audio output 184 may involve streaming synthesized waveforms to a speaker or headphones; and presentation of video output may involve frame-by-frame rendering of an animated avatar with synchronized lip movements. In some embodiments, presentation may further adapt the output 156 to device-specific constraints, such as scaling text for small displays, adjusting audio bitrate for low-bandwidth connections, or optimizing video rendering for limited GPU resources. By distinguishing between the multimodal output representation 168 and the generated output 156, system 100 may ensure that validated knowledge is not only modality-specific but also appropriately rendered for the end-user environment.

With continued reference to FIG. 1, in an embodiment, the output 156 may include a text output 181. For purposes of this disclosure, a "text output" is a modality-specific rendering of the response representation 162 in which selected content and associated metadata are formatted as natural language text. In some embodiments, generating the text output 181 may include mapping prioritized knowledge elements from the response representation 162 into grammatically correct sentences or paragraphs using a language-generation module. For example, a response representation 162 containing a principle, a decision, and a scenario snippet may be assembled into a narrative such as: "I have always valued transparency. This guided my decision to implement open salary bands, which proved critical during annual reviews." In an embodiment, text outputs 181 may be displayed through companion device 144 interfaces including, without limitation, graphical displays, chat interfaces, email integrations, or messaging platforms. In some cases, metadata such as emphasis markers or relational tags may be rendered as formatting instructions (e.g., bolding, indentation, or sequencing indicators) to preserve structural and contextual fidelity in the textual form.

In further reference to FIG. 1, in some embodiments, generating the text output 181 may be implemented through either rule-based templating or model-driven natural language generation (NLG). In a rule-based configuration, system 100 may apply grammar templates that insert features from the response representation 162 into predefined slots, ensuring syntactic correctness and consistent formatting. For example, a principle field may populate the opening clause of a sentence, followed by a decision field in the predicate, and a scenario snippet field in a dependent clause. In a model-driven configuration, a language model may be applied to transform the prioritized field set 161 into fluid narrative text, leveraging contextual embeddings of the paired semantic, temporal, and relational tags. Non-limiting examples of training data for such models may include corpora of conversational transcripts, autobiographical writings, and/or curated historical documents, enabling the model to emulate natural discourse styles. In certain cases, hybrid approaches may be applied, wherein templated structures provide structural boundaries while a model generates connective phrasing or contextual elaborations to enhance readability and preserve fidelity to the represented individual's voice.

Still referring to FIG. 1, in some embodiments, generating the text output 181 may further include applying the personalization algorithm 154 to adjust tone 188, vocabulary, and language complexity 192 as a function of a relationship attribute 194 encoded in the companion profile 196. For example, when the relationship attribute 194 indicates that the requesting user is a child of the represented individual, the personalization algorithm 154 may simplify sentence structure, substitute technical terminology with more accessible language, and apply a nurturing or instructive tone. Conversely, when the relationship attribute 194 corresponds to a peer or professional colleague, system 100 may maintain domain-specific vocabulary, employ formal grammar, and adopt a tone 188 aligned with professional correspondence. In an embodiment, personalization may also account for cultural and linguistic preferences, such as dialectal variants, idiomatic phrasing, or formality levels, to ensure that the rendered text output 181 authentically mirrors how the represented individual would have communicated with the specific recipient. In some cases, personalization may be dynamically refined through reinforcement learning, whereby feedback from prior interactions guides subsequent adaptations of the text output 181.

In continued reference to FIG. 1, in an embodiment, generating the text output 181 may further include formatting and delivery operations that adapt the response representation 162 into presentation-ready textual artifacts. In an embodiment, formatting may include applying style attributes such as headings, emphasis markers, or bullet structures to distinguish between principles, decisions, and scenario snippets, thereby improving readability and contextual clarity. For instance, principles may be displayed in bold text, decisions in standard prose, and scenario snippets as indented quotations. Delivery may be configured to align with the capabilities of the companion device 144 and the preferences of the requesting user, such as transmitting the text output 181 as an instant message, rendering it as a notification overlay on a graphical interface, or compiling it into a transcript or long-form narrative for archival purposes. In some cases, the formatting engine may also support multimodal alignment, embedding hyperlinks to associated audio or video segments so that the textual representation remains integrated with other available modalities. These formatting and delivery mechanisms may ensure that text outputs 181 not only convey substantive content but also preserve contextual cues that reflect the communication style of the represented individual.

With further reference to FIG. 1, in some cases, the output 156 may include a synthetic voice output 178. In an embodiment, generating the synthetic voice output 178 may include retrieving acoustic parameters 180 associated with the response representation 162 from a voice database 182. For purposes of this disclosure, a "synthetic voice output" is an audio rendering of the response representation 162. In some cases, the synthetic voice output 178 may be generated by applying stored or modeled acoustic characteristics of the represented individual's voice to textual or symbolic content. Further, in an embodiment, generating the synthetic voice output 178 may include retrieving acoustic parameters 180 associated with the response representation 162 from a voice database 182. Non-limiting examples of acoustic parameters 180 may include, without limitation, pitch, timbre, prosody, phoneme duration, speaking rate, and/or vocal intensity values that define the perceptual qualities of a voice. For purposes of this disclosure, a "voice database" is a structured repository of acoustic parameters derived from recorded samples of the represented individual's speech. In an embodiment, the acoustic parameters 180 may be processed through signal analysis techniques (e.g., spectral decomposition, pitch contour extraction, and formant modeling) or through training a voice-cloning model using a corpus of the individual's speech recordings. In some cases, the voice database 182 may also store embeddings generated by neural speech synthesis models, such as speaker encoders, that capture the unique vocal identity of the represented individual. By retrieving acoustic parameters 180 aligned with the response representation 162, system 100 may ensure that subsequent synthesis stages can generate speech that closely mirrors the cadence and tone of the individual being represented.

In continued reference to FIG. 1, in some embodiments, acoustic parameters 180 stored in the voice database 182 may be derived through low-level signal processing of recorded speech samples. For example, Fourier analysis may be applied to extract pitch and harmonic spectra, linear predictive coding may be used to model formants and vocal tract resonances, and time-domain analysis may capture phoneme duration and energy contours. In an embodiment, these features may be normalized across multiple recordings to produce parameter distributions that represent stable characteristics of the represented individual's voice, rather than transient variations introduced by noise or recording conditions. In some cases, statistical models such as Gaussian mixture models or hidden Markov models may be trained to estimate parameter ranges, thereby enabling the synthesis engine to generalize across different utterances while maintaining a consistent vocal identity.

With continued reference to FIG. 1, in other embodiments, acoustic parameters 180 may be generated through machine-learning approaches, where a neural network such as a speaker encoder is trained on the represented individual's speech samples to produce high-dimensional embeddings. In an embodiment, these embeddings may capture complex vocal attributes, including timbre, prosody, and articulation patterns, in a form that can be directly used by neural speech synthesizers such as Tacotron, FastSpeech, or WaveNet. Non-limiting examples of training data for such embeddings may include hours of recorded speech segmented into phonetic units and aligned with transcripts to ensure accurate mapping of content to acoustic features. Once trained, the voice database 182 may store both the raw embeddings and associated mapping functions, enabling system 100 to retrieve a parameter set appropriate for each response representation 162.

Still referring to FIG. 1, in an embodiment, generating the synthetic voice output 178 may include synthesizing an audio output 184 as a function of applying the acoustic parameters 180 to the response representation 162 to produce the synthetic voice output 178. For purposes of this disclosure, an "audio output" is a digitally synthesized waveform or sound file generated by mapping textual or symbolic content of the response representation 162 to acoustic parameters 180 that reflect the vocal characteristics of the represented individual. The audio output 184 is a perceptible artifact that may be streamed, buffered, or stored for playback on a companion device 144. In some embodiments, synthesizing the audio output 184 may further include applying continuity rules 186 to preserve the naturalness of speech across sequential segments. For purposes of this disclosure, "continuity rules" are algorithmic constraints designed to maintain consistent cadence, prosody, and vocal flow when multiple phonetic units, words, or sentences are stitched together during synthesis. In an embodiment, continuity rules 186 may ensure that transitions between speech segments remain fluid, avoiding abrupt changes in pitch, rhythm, or volume. For example, a continuity rule may enforce that rising intonation in a principle statement is followed by a falling intonation in the subsequent decision statement to mirror natural speech patterns. In some cases, continuity rules 186 may also include prosodic alignment routines that model pause placement, syllable lengthening, and stress assignment to ensure that outputs 156 remain expressive and faithful to the speaking style of the represented individual.

In further reference to FIG. 1, in an embodiment, continuity rules 186 may be enforced using a combination of deterministic algorithms and machine-learning models trained on speech corpora. In some embodiments, deterministic algorithms may apply prosody modeling techniques such as ToBI (Tones and Break Indices) annotation or rule-based pause insertion to regulate phrasing and intonation across sentence boundaries. In other embodiments, duration prediction models may be employed to estimate optimal phoneme lengthening or shortening, ensuring that speech remains natural when concatenating multiple content elements. In an embodiment, machine-learning models, such as transformer-based prosody predictors or recurrent neural networks trained on aligned audio-text datasets, may be used to dynamically generate cadence and stress patterns that match the speaking style of the represented individual. Cross-segment smoothing algorithms, including overlap-add methods and pitch-contour interpolation, may further be applied to ensure that adjacent waveform segments merge seamlessly without audible discontinuities. In some cases, continuity rules 186 may also be adaptive, modifying prosody in response to invocation signal type 172, for example, applying more deliberate pacing for reflective principles or faster tempo for urgent scenario snippets. These implementation techniques may collectively ensure that the synthetic voice output 178 maintains coherence, expressiveness, and fidelity to the represented individual's natural speech.

With further reference to FIG. 1, in an embodiment, generating the synthetic voice output 178 may include applying the personalization algorithm 154 to the audio output 184. In an embodiment, the personalization algorithm 154 may be configured to adjust at least one of tone 188, delivery style 190, and language complexity 192 of the audio output 184 as a function of a relationship attribute 194 of a companion profile 196 associated with the companion device 144. For purposes of this disclosure, "tone" refers to the emotional coloration of speech. For example, such as warm, authoritative, or formal, which may be controlled by modulating pitch contours, intensity, and prosodic emphasis. "Delivery style," for purposes of this disclosure, refers to the pacing, rhythm, and expressive variation of speech. For example, such as conversational, didactic, or narrative, which may be adapted by adjusting segment duration, pause frequency, and stress distribution. For purposes of this disclosure, "language complexity" refers to the syntactic and lexical difficulty of the spoken content. Which, in some cases, may range from simplified phrasing for younger listeners to technical or domain-specific terminology for professional audiences. For purposes of this disclosure, a "relationship attribute" is metadata in the companion profile 196 that characterizes the listener's connection to the represented individual. For example, such as child, colleague, or mentee. As a further example, if the relationship attribute 194 indicates that the listener is a child, the personalization algorithm 154 may adjust tone 188 toward warmth, delivery style 190 toward storytelling cadence, and language complexity 192 toward simplified vocabulary. In another example, if the relationship attribute 194 indicates a professional colleague, the algorithm may select a more formal tone, concise delivery, and domain-appropriate terminology. By incorporating relationship-driven personalization, system 100 may ensure that synthetic voice outputs 178 are not only technically faithful to the represented individual's voice but also contextually and relationally appropriate to the listener.

Still referring to FIG. 1, in an embodiment, the personalization algorithm 154 may be realized through parametric adjustment models, machine-learning frameworks, or hybrid approaches that operate during or after speech synthesis. In some embodiments, parametric adjustment may involve dynamically modifying acoustic features such as pitch range, speech rate, and spectral tilt using signal-processing techniques to achieve the desired tone 188 and delivery style 190. In other embodiments, personalization may be achieved through fine-tuning neural speech synthesis models, such as Tacotron, FastSpeech, or WaveNet, with training data stratified by listener type or relationship attribute 194. For example, training sets may include paired speech samples and annotations specifying target audience (e.g., child-directed speech vs. professional discourse), enabling the model to learn mappings between relationship attributes 194 and prosodic or lexical adjustments. At inference time, these models may receive both the response representation 162 and the relationship attribute 194 as inputs, generating an audio output 184 tailored to the companion profile 196. In still other cases, adaptive tuning may occur through feedback loops, where real-time user interactions, such as requests for simplification or more detail, inform incremental adjustments to tone 188, pacing, or vocabulary. By incorporating these technical mechanisms, system 100 may ensure that personalization of the synthetic voice output 178 is not only rule-based but also dynamically responsive to both preconfigured profiles and evolving listener needs.

With further reference to FIG. 1, in an embodiment, generating the output 156 may include rendering a video/avatar output 179 as a function of the response representation 162. For purposes of this disclosure, a "video/avatar output" is a modality-specific rendering that visually depicts the represented individual through either pre-recorded video segments or dynamically generated avatar animations synchronized with the underlying response content. In some embodiments, system 100 may access a library of recorded video clips associated with the represented individual, each indexed by semantic tags and acoustic markers, and stitch these clips together into a coherent sequence aligned with the response representation 162. In other embodiments, an avatar pipeline may be employed, wherein a digital likeness of the represented individual is generated using facial animation models, lip synchronization engines, and gesture-mapping modules. For example, a response representation 162 containing the phrase "trust your instincts" may be rendered as a video avatar speaking the phrase in the represented individual's synthetic voice while displaying characteristic head nods or hand movements. In an embodiment, the avatar pipeline may further incorporate personalization signals from the companion profile 196, adjusting non-verbal behaviors such as eye contact duration, facial expressiveness, and/or pacing of gestures to reflect the relationship attribute 194 of the requesting user.

In continued reference to FIG. 1, in an embodiment, the clip-stitching pipeline may leverage a video indexing subsystem that maps video segments to metadata entries generated during knowledge harvesting. In an embodiment, each clip may be annotated with semantic tags (e.g., "principle," "decision," "scenario snippet"), acoustic markers (e.g., prosody, tone 188, volume), and temporal markers (e.g., pause length, gesture timing). At runtime, a sequencing engine may align the ordered elements of the response representation 162 with corresponding indexed clips, resolving mismatches using a nearest-neighbor search or semantic similarity score. In an embodiment, once aligned, a stitching module may normalize color profiles, adjust frame rates, and apply temporal smoothing filters to eliminate visual discontinuities between segments. In some cases, audio-video synchronization may be validated by a lip-alignment algorithm that ensures phoneme-to-viseme matching within a specified tolerance threshold, such as ±40 milliseconds.

With further reference to FIG. 1, in other embodiments, the avatar pipeline may employ a generative animation framework trained on datasets of the represented individual's facial expressions, vocal patterns, and gestures. In an embodiment, a viseme-prediction module may receive text or audio tokens from the response representation 162 and generate synchronized mouth shapes, while a facial rigging model animates expressions such as smiles, eyebrow raises, or nods in alignment with semantic emphasis tags. Further, in some cases, a gesture-mapping module may further integrate relational and contextual tags 128, triggering specific body language based on content type; for instance, scenario snippets may invoke more illustrative hand gestures, whereas principles may be delivered with steadier posture and deliberate pacing. The training data for such models may include motion-capture recordings, annotated video samples, and acoustic-visual correlation corpora.

In continued reference to FIG. 1, in some embodiments, the avatar pipeline may also incorporate personalization logic to adapt visual delivery to the requesting user. For example, if the companion profile 196 indicates a close familial relationship, system 100 may bias facial animation toward warmer expressions and increased eye contact, whereas for professional relationships, the avatar may adopt a more formal tone with restrained gestures. In an embodiment, these adjustments may be governed by learned preference models, trained on prior interactions with the requesting user and reinforced through feedback signals such as interaction length, engagement metrics, and sentiment analysis.

Still referring to FIG. 1, in an embodiment, system 100 may dynamically select between the clip-stitching pipeline and the avatar-generation pipeline based on factors such as data availability, device capability, and user preference 176. For example, if a sufficient number of semantically indexed video clips exist for the requested response, system 100 may default to the clip-stitching pipeline to maximize authenticity by using actual recordings of the represented individual. Conversely, if clip coverage is incomplete, if the invocation signal 152 requires a novel utterance not present in stored recordings, or if the requesting companion device 144 lacks the bandwidth for high-resolution video playback, system 100 may employ the avatar-generation pipeline to synthesize the required output 156. In some embodiments, a hybrid strategy may be applied, wherein stitched video segments are supplemented with generative avatar transitions to smooth over content gaps, creating a seamless experience. In an embodiment, selection between these pipelines may be governed by an orchestration module that evaluates metadata completeness, computational load, and preference signals from the companion profile 196, ensuring that the rendered output 156 is both technically feasible and contextually faithful to the represented individual's knowledge.

In continued reference to FIG. 1, for purposes of this disclosure, an "orchestration module" is a coordination layer configured to manage the decision-making process between multiple video/avatar rendering pipelines. In some embodiments, the orchestration module may include a rule-based logic engine supplemented by a machine-learning model trained on historical rendering outcomes and user satisfaction feedback. In an embodiment, the module may receive as input metadata from the response representation 162 (e.g., semantic tags, acoustic markers, required gestures), system resource status (e.g., available GPU cycles, memory bandwidth), and companion profile attributes (e.g., user preference 176 for authentic recordings over synthesized avatars). Based on these inputs, the orchestration module may assign priority scores to candidate rendering strategies, applying thresholds or weighted decision criteria to select a final pipeline. For example, if a requested utterance exists in the video library with a confidence match above a defined similarity threshold, the orchestration module may trigger the clip-stitching pipeline. If the similarity score falls below the threshold, or if non-verbal personalization (e.g., adaptive gestures for a grandchild profile) is required, the module may select the avatar-generation pipeline. In some cases, the orchestration module may output a hybrid plan, where video clips are combined with generated avatar animations to ensure continuity and completeness.

With continued reference to FIG. 1, in some embodiments, the orchestration module may incorporate a machine-learning model trained to optimize pipeline selection based on multimodal performance criteria. Non-limiting examples of training data may include annotated examples of response representations 162 paired with corresponding successful outputs 156, where "success" is defined according to objective metrics such as temporal alignment accuracy, lip synchronization fidelity, gesture congruence, and user satisfaction scores collected through companion device 144 feedback. In an embodiment, the training set may further include negative examples, such as misaligned video stitching or unnatural avatar motions, which allow the model to learn discriminative boundaries between acceptable and unacceptable renderings. In an embodiment, the orchestration model may employ supervised learning techniques, wherein labels indicate the optimal rendering path for each training instance, or reinforcement learning techniques, wherein the model is rewarded for selecting pipelines that yield higher downstream validation scores or user preference 176 confirmations. In some cases, the orchestration module may incorporate online learning logic, dynamically adjusting decision weights as new interaction data is collected during deployment. For example, if a particular user consistently opts for avatar outputs over stitched video, the model may gradually increase the probability of defaulting to the avatar pipeline for that user's profile. By leveraging these training strategies, system 100 may ensure that pipeline selection evolves with both technical performance demands and individualized usage patterns.

In further reference to FIG. 1, in some embodiments, the orchestration module may further implement fallback and error recovery procedures to ensure continuity of service when the preferred rendering pipeline cannot be executed successfully. For example, if the video stitching module fails due to insufficient clip coverage or corrupted media, the orchestration logic may automatically switch to the avatar pipeline, synthesizing the same response representation 162 using generative facial animation and synthetic voice output 178. Conversely, if the avatar pipeline encounters a processing error such as degraded lip synchronization or GPU resource exhaustion, system 100 may revert to a textual or audio-only rendering as a secondary fallback. In an embodiment, these fallback procedures may be governed by a hierarchical decision tree that evaluates modality priority, device capabilities, and response criticality in real time. For instance, principles tagged as "high priority" may always trigger at least an audio rendering even if visual output fails, while lower-priority scenario snippets may be deferred until resources are restored. In some cases, error recovery routines may additionally log failure states and user responses, feeding this information back into the orchestration model to refine its decision-making and improve resilience during subsequent interactions.

With further reference to FIG. 1, in some embodiments, once an output 156 has been presented at the companion device 144, system 100 may initiate post-presentation behaviors to record, evaluate, and adapt future outputs 156. For purposes of this disclosure, "post-presentation behaviors" refer to operations that occur after the output 156 has been rendered. For example, this may include logging delivery events, capturing user interaction data, and/or updating personalization models. In an embodiment, system 100 may log metadata such as the type of output 156 delivered, the selected modality, the invocation signal 152 that prompted the response, and/or the companion device 144 on which it was rendered. In some cases, feedback signals, such as explicit user ratings, implicit cues like playback duration, or follow-up queries, may be captured and used to refine personalization algorithms 154 or update weighting parameters in the prioritization process 160. In still other embodiments, system 100 may employ adaptive learning routines that identify patterns across multiple presentations, such as repeated preference for audio over text, and automatically adjust user preference profiles or device configuration settings. By incorporating post-presentation behaviors, system 100 may ensure that outputs 156 do not remain static but instead contribute to a continuous improvement cycle that enhances fidelity, relevance, and user satisfaction over time.

Now referring to FIG. 2, a networked computing environment 200 configured for interactive legacy representation is illustrated. In the illustrated embodiment, a secure vault data structure implemented in a networked computing environment is communicatively connected to a plurality of companion devices, including but not limited to a laptop computer, a handheld smartphone, and a tablet device. Each companion device may transmit invocation signals to the networked computing environment and receive multimodal outputs in response. In some embodiments, the networked computing environment may include one or more processors, memories, and pipelines as described with reference to FIG. 1, such that structured knowledge objects stored in the secure vault data structure may be synchronized across the companion devices using scheduling protocols, back-pressure rules, and conflict resolution routines.

With continued reference to FIG. 2, in further embodiments, additional types of companion devices may be employed, including wearable devices (e.g., smartwatches, head-mounted displays, or pendants) or dedicated appliances designed specifically for legacy interaction (e.g., tabletop hubs with integrated microphones and speakers). In an embodiment, these devices may be used not only by family members or successors seeking to interact with the representation, but also by the represented individual during the setup and population phase of the secure vault. For example, the represented individual may provide responses to questionnaires, participate in guided interview sessions, or contribute open-ended reflections directly through a dedicated appliance. In other embodiments, the represented individual may provide input data through one or more general-purpose companion devices, such as a smartphone or laptop, thereby allowing the system to capture, preprocess, and encode multimodal inputs into structured knowledge objects.

Still referring to FIG. 2, in an embodiment, by supporting both ingestion of input data from the represented individual and subsequent access to outputs by companion users, FIG. 2 conveys that system 100 operates within a networked computing environment to provide both setup convenience and use convenience while ensuring that all interactions are stored and managed within a secure representation of the individual.

In further reference to FIG. 2, in some embodiments, during a harvesting phase, companion devices may further be configured to capture conversations or interactions between the represented individual and other users. For example, a smartphone, laptop, or dedicated appliance may record audio, video, or text-based exchanges that occur during daily communications, guided interviews, or informal discussions. In an embodiment, these captured interactions may then be processed by the knowledge-harvesting engine to extract features, assign contextual tags, and encode knowledge elements reflective of the represented individual's personality, values, and decision-making patterns. In certain cases, the system may use these harvested conversations not only to enrich the structured knowledge object but also to personalize downstream interactions, enabling the legacy representation to emulate relational dynamics specific to the represented individual. In an embodiment, by leveraging both direct input from the represented individual and conversational data captured through companion devices, the system may produce a more authentic and contextually nuanced representation that aligns with the lived experiences and interpersonal style of the individual.

Figure 3:
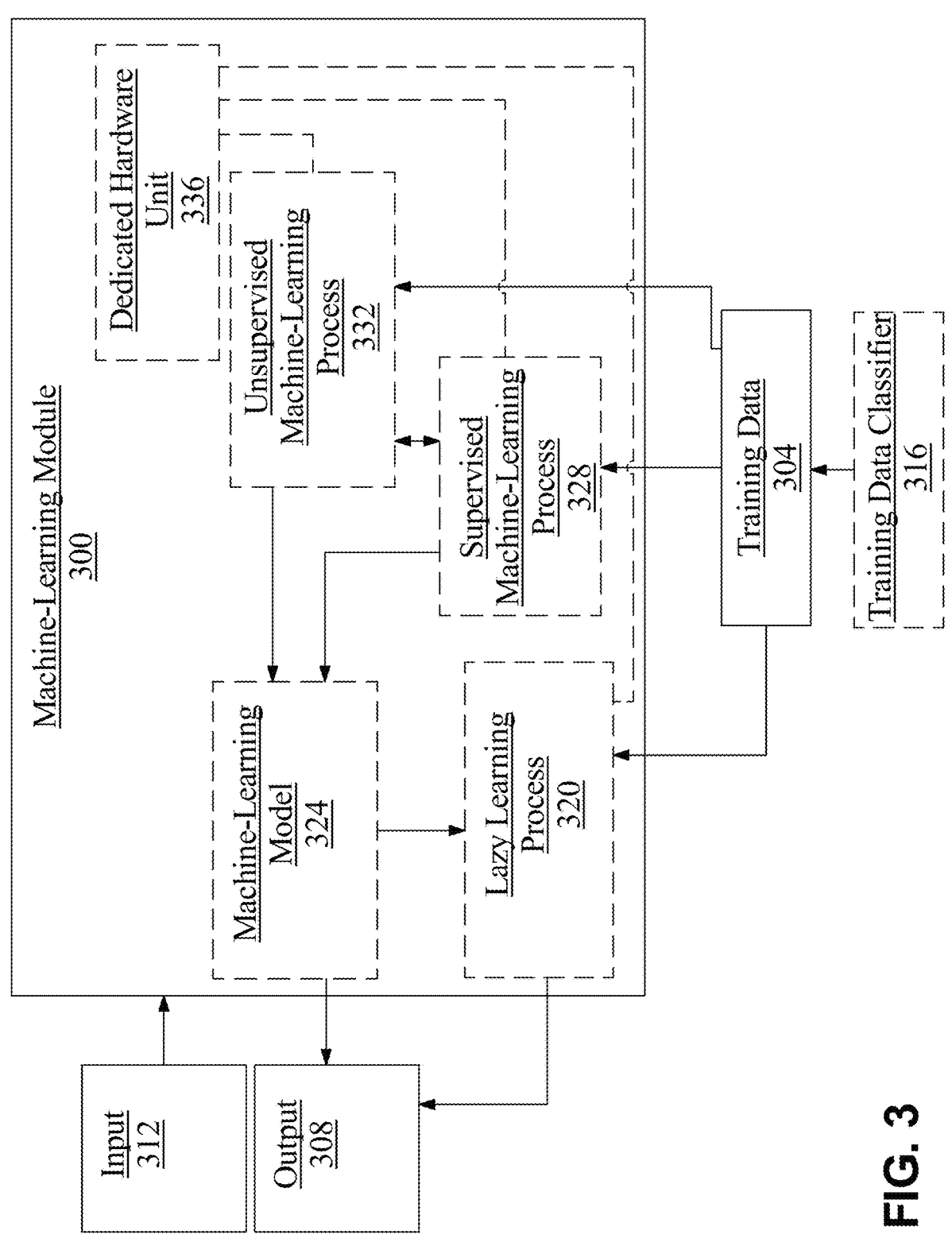
FIG. 3 is an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, training data may include input data such as recorded audio statements, video clips, and text documents provided by the represented individual, correlated to output data such as structured knowledge objects containing features tagged as principles, decisions, and scenario snippets.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to identify cohorts of contextual tags representing principles, decisions, or scenario snippets associated with particular relational or temporal attributes, thereby enabling the system to select a subpopulation of training data tailored to the represented individual's knowledge schema or a specific personalization pathway.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
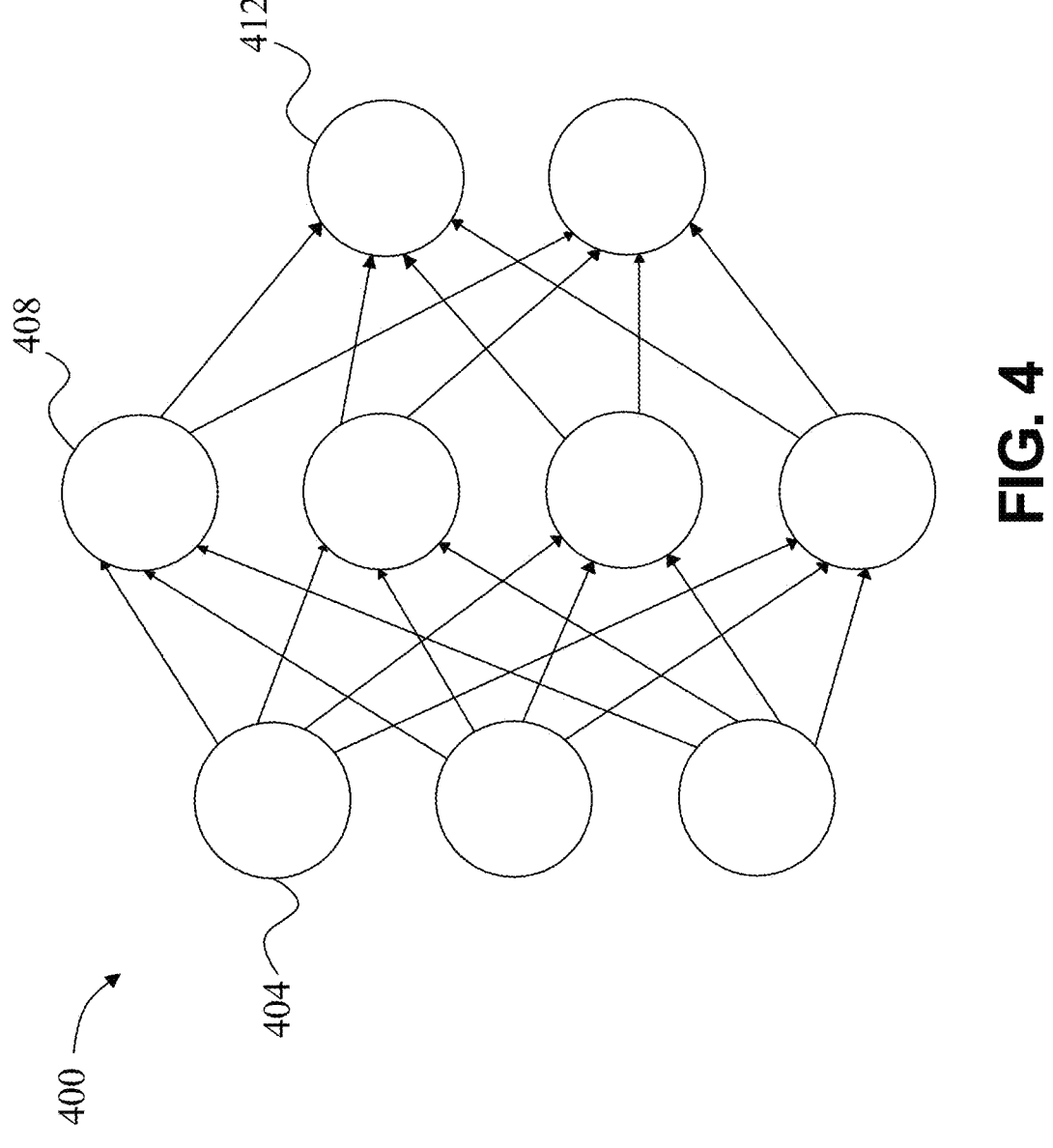
FIG. 4 is an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
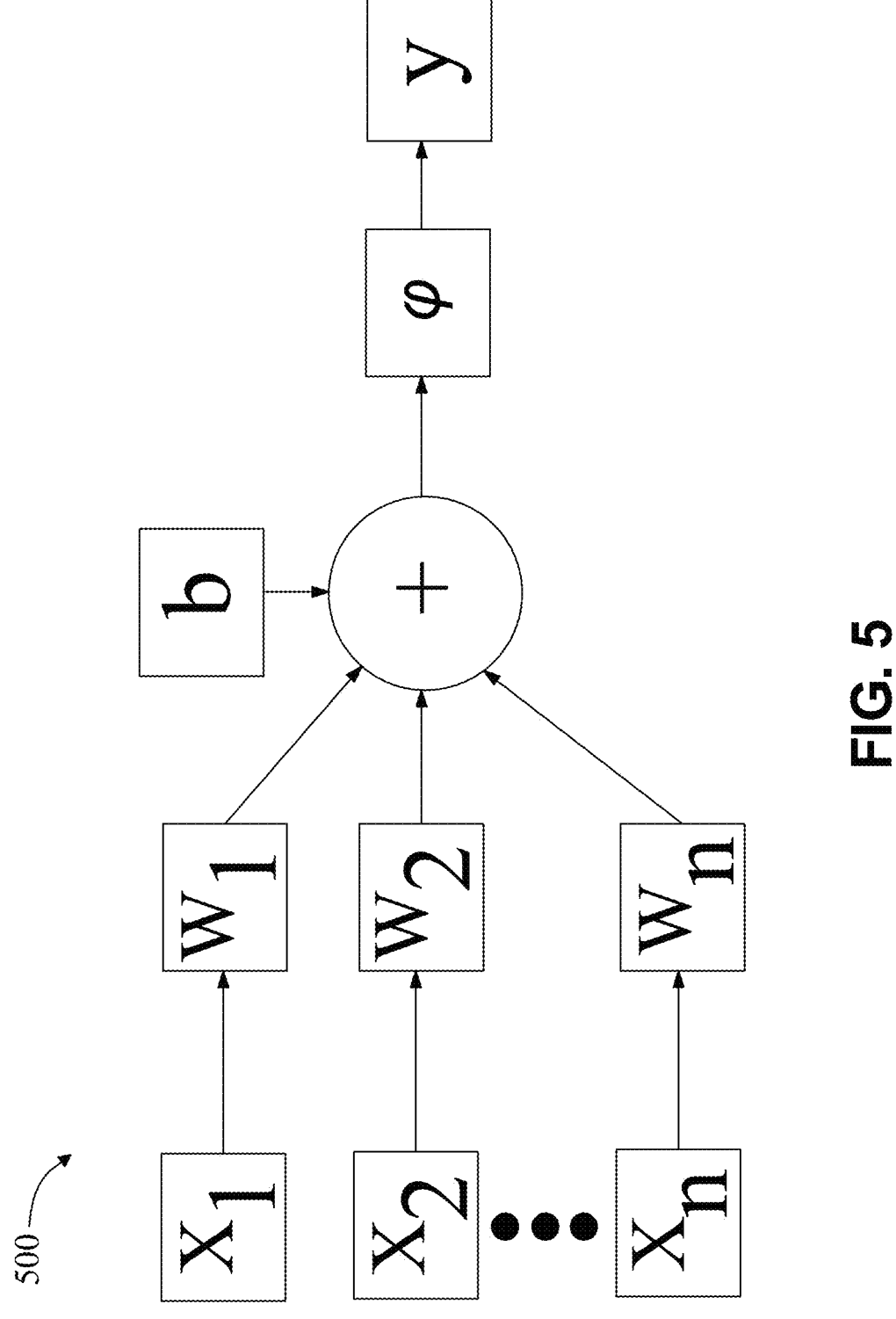
FIG. 5 is an exemplary embodiment of a node of a neural network.

Referring now to FIG. 5, an exemplary embodiment of a node 500 of a neural network is illustrated. A node may include, without limitation a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x \cdot \text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, $\alpha$ is a parameter to set the learning rate, and dj/dw is the partial derivative of with respect to weight w.

Now referring to FIG. 6, a flow diagram of an exemplary method 600 for implementing secure data models and synchronization for interactive legacy representation is illustrated. Method 600 may include a step 605 of receiving, by at least a processor, input data at a knowledge-harvesting engine. This may be implemented, without limitation, as referenced in FIGS. 1-5.

In continued reference to FIG. 6, method 600 may include a step 610 of generating, using the knowledge-harvesting engine, a structured knowledge object. Wherein, in an embodiment, generating the structured knowledge object may include extracting a plurality of features from the input data using an extraction pipeline, assigning contextual tags to each feature of the plurality of features using a tagging pipeline, wherein the tagging pipeline may be configured to associate each feature with one or more knowledge elements as a function of one or more of semantic, temporal, and relational characteristics of the feature, and encoding paired contextual tags and features of each feature of the plurality of features into the structured knowledge object as fields of a data schema. This may be implemented, without limitation, as referenced in FIGS. 1-5.

In further reference to FIG. 6, method 600 may include a step 615 of storing, using the at least a processor, the structured knowledge object in a secure vault data structure implemented in a networked computing environment. This may be implemented, without limitation, as referenced in FIGS. 1-5.

Still referring to FIG. 6, method 600 may include synchronizing, using the at least a processor, the secure vault data structure with a companion device using a synchronization pipeline, wherein the synchronization pipeline may be configured to: initiate an update of the secure vault data structure as a function of a scheduling protocol, regulate transfer of the secure vault data structure by applying back-pressure rules as a function of a constraint condition, and reconcile discrepancies between versions of the secure vault data structure maintained at the networked computing environment and the companion device. This may be implemented, without limitation, as referenced in FIGS. 1-5.

With further reference to FIG. 6, method 600 may include receiving, by the a least a processor and from a companion device, an invocation signal, accessing, using the at least a processor, one or more fields of the data schema of the structured knowledge object as a function of the invocation signal and a personalization algorithm, and generating, using the at least a processor, an output formatted as a function of one or more accessed fields. In an embodiment, the personalization algorithm may include governance rules, wherein the governance rules are configured to govern accessibility of the one or more fields of the data schema as a function of a contextual attribute of a companion profile and the paired contextual tags and features of the structured knowledge object. In an embodiment, generating the output may include mapping the invocation signal to the one or more accessed fields as a function of the paired contextual tags and features of the structured knowledge object, applying a prioritization process to the one or more accessed fields, wherein applying the prioritization process to the one or more accessed fields elevates a first set of fields associated with contextual tags representing principles relative to a second set of fields associated with contextual tags representing decisions and a third set of fields associated with contextual tags representing scenario snippets, and generating a response representation as a function of a prioritized field set, wherein generating the response representation includes assembling content from the prioritized field set into a structured sequence configured for presentation to the companion device. This may be implemented, without limitation, as referenced in FIGS. 1-5.

In continued reference to 6, method 600 may include validating, using the at least a processor, a response representation, wherein validating the response representation includes: comparing one or more fields of the data schema accessed to generate the response representation against a fidelity rule set and validating the response representation as a function of comparing the one or more fields against the fidelity rule set. This may be implemented, without limitation, as referenced in FIGS. 1-5.

Still referring to FIG. 6, method 600 may include receiving, by the at least a processor, an invocation signal from a companion device, generating, using the at least a processor, a multimodal output representation as a function of the invocation signal, wherein generating the multimodal output representation includes: selecting an output format as a function of one or more of an invocation signal type, a companion device capability, and a user preference and assembling content from one or more fields of the data schema of the structured knowledge object into the multimodal output representation corresponding to the output format, and generating, using the at least a processor, an output for presentation at the companion device as a function of the multimodal output representation. This may be implemented, without limitation, as referenced in FIGS. 1-5.

With further reference to FIG. 6, method 600 may include generating a synthetic voice output, wherein generating the synthetic voice output includes generating a response representation wherein generating the response representation comprises assembling content from one or more fields of the data schema of the structured knowledge object, retrieving acoustic parameters associated with the response representation from a voice database, and synthesizing an audio output as a function of applying the acoustic parameters to the response representation to produce the synthetic voice output. In an embodiment, synthesizing the audio output may include applying continuity rules to the audio output, wherein the continuity rules are configured to preserve cadence and prosody across sequential speech segments of the synthetic voice output. In an embodiment, generating the synthetic voice output may include applying a personalization algorithm to the audio output, wherein the personalization algorithm may be configured to adjust at least one of tone, delivery style, and language complexity of the audio output as a function of a relationship attribute of a companion profile associated with the companion device. This may be implemented, without limitation, as referenced in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
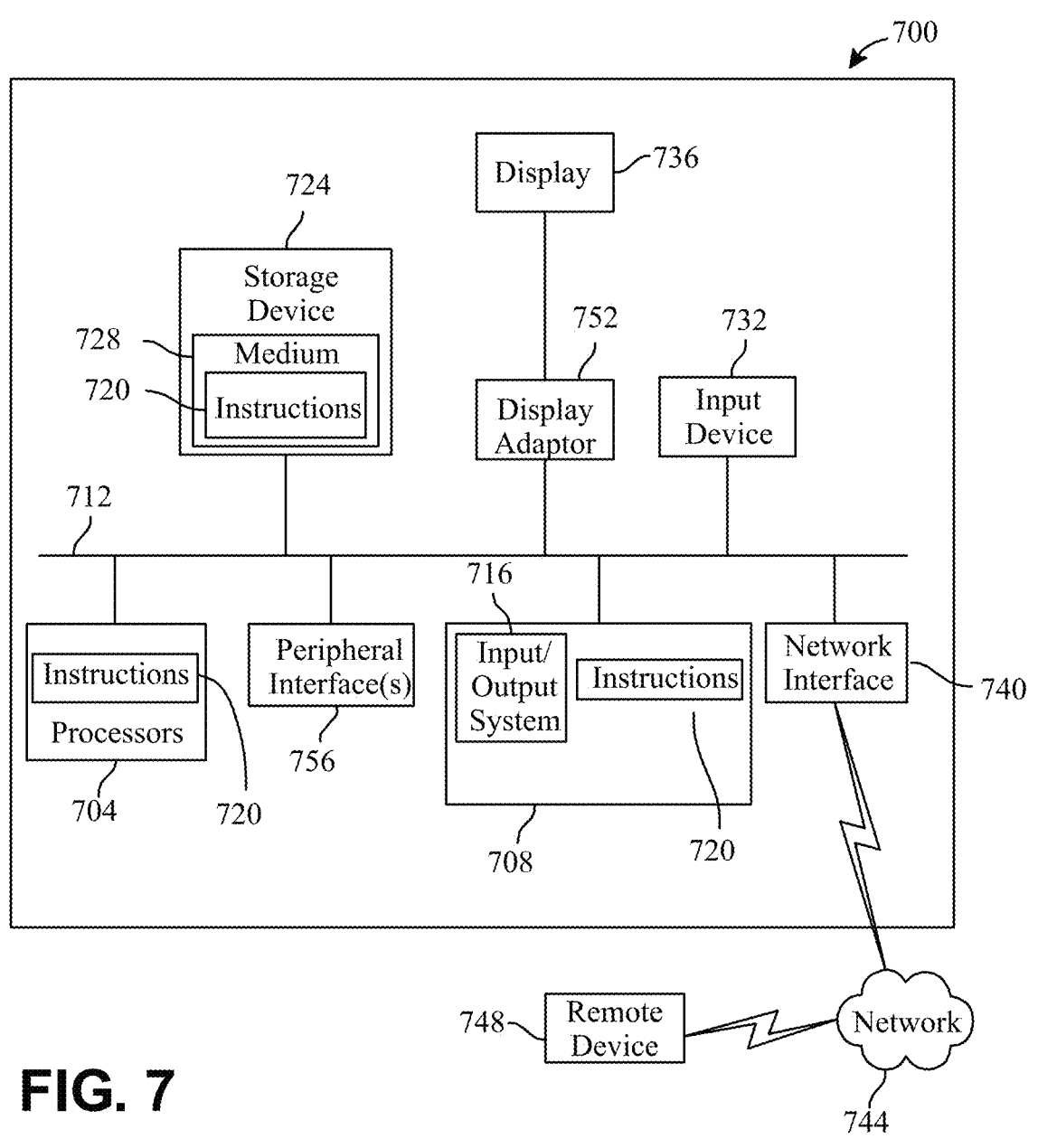
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform in a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device

724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for secure data models and synchronization for interactive legacy representation, the system comprising:
   at least a processor; and
   a memory communicatively connected to the at least a processor, wherein the memory contains instructions configuring the at least a processor to:
      receive input data through a knowledge-harvesting engine;
      generate, using the knowledge-harvesting engine, a structured knowledge object, wherein generating the structured knowledge object comprises:
         extracting a plurality of features from the input data using an extraction pipeline;
         assigning contextual tags to each feature of the plurality of features using a tagging pipeline, wherein the tagging pipeline is configured to associate each feature with one or more knowledge elements as a function of one or more of semantic, temporal, and relational characteristics of the feature; and
         encoding paired contextual tags and features of each feature of the plurality of features into the structured knowledge object as fields of a data schema; and
      store the structured knowledge object in a secure vault data structure, wherein:
         the secure vault data structure is implemented in a networked computing environment; and
         the secure vault data structure comprises:
            cryptographic integrity markers configured to verify object integrity; and
            synchronization logic configured to detect and resolve version conflicts across distributed devices of the networked computing environment.

2. The system of claim 1, wherein the at least a processor is further configured to synchronize the secure vault data structure with a companion device using a synchronization pipeline, wherein the synchronization pipeline is configured to:
   initiate an update of the secure vault data structure as a function of a scheduling protocol;
   regulate transfer of the secure vault data structure by applying back-pressure rules as a function of a constraint condition; and
   reconcile discrepancies between versions of the secure vault data structure maintained at the networked computing environment and the companion device.

3. The system of claim 1, wherein the at least a processor is further configured to:
   receive, from a companion device, an invocation signal;
   access one or more fields of the data schema of the structured knowledge object as a function of the invocation signal and a personalization algorithm; and
   generate an output formatted as a function of one or more accessed fields.

4. The system of claim 3, wherein the personalization algorithm comprises governance rules, wherein the governance rules are configured to govern accessibility of the one or more fields of the data schema as a function of a contextual attribute of a companion profile and the paired contextual tags and features of the structured knowledge object.

5. The system of claim 3, wherein generating the output comprises:

mapping the invocation signal to the one or more accessed fields as a function of the paired contextual tags and features of the structured knowledge object;

applying a prioritization process to the one or more accessed fields, wherein applying the prioritization process to the one or more accessed fields elevates a first set of fields associated with contextual tags representing principles relative to a second set of fields associated with contextual tags representing decisions and a third set of fields associated with contextual tags representing scenario snippets; and generating a response representation as a function of a prioritized field set, wherein generating the response representation comprises assembling content from the prioritized field set into a structured sequence configured for presentation to the companion device.

6. The system of claim 1, wherein the at least a processor is further configured to validate a response representation, wherein validating the response representation comprises:

comparing one or more fields of the data schema accessed to generate the response representation against a fidelity rule set; and validating the response representation as a function of comparing the one or more fields against the fidelity rule set.

7. The system of claim 1, wherein the at least a processor is further configured to:

receive an invocation signal from a companion device;

generate a multimodal output representation as a function of the invocation signal, wherein generating the multimodal output representation comprises:

selecting an output format as a function of one or more of an invocation signal type, a companion device capability, and a user preference; and assembling content from one or more fields of the data schema of the structured knowledge object into the multimodal output representation corresponding to the output format; and generate an output for presentation at the companion device as a function of the multimodal output representation.

8. The system of claim 7, wherein:

the output comprises a synthetic voice output; and generating the synthetic voice output comprises:

generating a response representation wherein generating the response representation comprises assembling content from one or more fields of the data schema of the structured knowledge object;

retrieving acoustic parameters associated with the response representation from a voice database; and synthesizing an audio output as a function of applying the acoustic parameters to the response representation to produce the synthetic voice output.

9. The system of claim 8, wherein synthesizing the audio output further comprises applying continuity rules to the audio output, wherein the continuity rules are configured to preserve cadence and prosody across sequential speech segments of the synthetic voice output.

10. The system of claim 8, wherein generating the synthetic voice output further comprises applying a personalization algorithm to the audio output, wherein the personalization algorithm is configured to adjust at least one of tone, delivery style, and language complexity of the audio output as a function of a relationship attribute of a companion profile associated with the companion device.

11. A method for implementing secure data models and synchronization for interactive legacy representation, the method comprising:

receiving, by at least a processor, input data through a knowledge-harvesting engine;

generating, using the knowledge-harvesting engine, a structured knowledge object, wherein generating the structured knowledge object comprises:

extracting a plurality of features from the input data using an extraction pipeline;

assigning contextual tags to each feature of the plurality of features using a tagging pipeline, wherein the tagging pipeline is configured to associate each feature with one or more knowledge elements as a function of one or more of semantic, temporal, and relational characteristics of the feature; and encoding paired contextual tags and features of each feature of the plurality of features into the structured knowledge object as fields of a data schema; and storing, using the at least a processor, the structured knowledge object in a secure vault data structure, wherein:

the secure vault data structure is implemented in a networked computing environment; and the secure vault data structure comprises:

cryptographic integrity markers configured to verify object integrity; and synchronization logic configured to detect and resolve version conflicts across distributed devices of the networked computing environment.

12. The method of claim 11, further comprising synchronizing, using the at least a processor, the secure vault data structure with a companion device using a synchronization pipeline, wherein the synchronization pipeline is configured to:

initiate an update of the secure vault data structure as a function of a scheduling protocol;

regulate transfer of the secure vault data structure by applying back-pressure rules as a function of a constraint condition; and reconcile discrepancies between versions of the secure vault data structure maintained at the networked computing environment and the companion device.

13. The method of claim 11, further comprising:

receiving, by the a least a processor and from a companion device, an invocation signal;

accessing, using the at least a processor, one or more fields of the data schema of the structured knowledge object as a function of the invocation signal and a personalization algorithm; and generating, using the at least a processor, an output formatted as a function of one or more accessed fields.

14. The method of claim 13, wherein the personalization algorithm comprises governance rules, wherein the governance rules are configured to govern accessibility of the one or more fields of the data schema as a function of a contextual attribute of a companion profile and the paired contextual tags and features of the structured knowledge object.

15. The method of claim 13, wherein generating the output comprises:

mapping the invocation signal to the one or more accessed fields as a function of the paired contextual tags and features of the structured knowledge object;

applying a prioritization process to the one or more accessed fields, wherein applying the prioritization process to the one or more accessed fields elevates a first set of fields associated with contextual tags representing principles relative to a second set of fields associated with contextual tags representing decisions and a third set of fields associated with contextual tags representing scenario snippets; and generating a response representation as a function of a prioritized field set, wherein generating the response representation comprises assembling content from the prioritized field set into a structured sequence configured for presentation to the companion device.

16. The method of claim 11, further comprising validating, using the at least a processor, a response representation, wherein validating the response representation comprises:

comparing one or more fields of the data schema accessed to generate the response representation against a fidelity rule set; and validating the response representation as a function of comparing the one or more fields against the fidelity rule set.

17. The method of claim 11, further comprising:

receiving, by the at least a processor, an invocation signal from a companion device;

generating, using the at least a processor, a multimodal output representation as a function of the invocation signal, wherein generating the multimodal output representation comprises:

selecting an output format as a function of one or more of an invocation signal type, a companion device capability, and a user preference; and assembling content from one or more fields of the data schema of the structured knowledge object into the multimodal output representation corresponding to the output format; and generating, using the at least a processor, an output for presentation at the companion device as a function of the multimodal output representation.

18. The method of claim 17, wherein:

the output comprises a synthetic voice output; and generating the synthetic voice output comprises:

generating a response representation wherein generating the response representation comprises assembling content from one or more fields of the data schema of the structured knowledge object;

retrieving acoustic parameters associated with the response representation from a voice database; and synthesizing an audio output as a function of applying the acoustic parameters to the response representation to produce the synthetic voice output.

19. The method of claim 18, wherein synthesizing the audio output further comprises applying continuity rules to the audio output, wherein the continuity rules are configured to preserve cadence and prosody across sequential speech segments of the synthetic voice output.

20. The method of claim 18, wherein generating the synthetic voice output further comprises applying a personalization algorithm to the audio output, wherein the personalization algorithm is configured to adjust at least one of tone, delivery style, and language complexity of the audio output as a function of a relationship attribute of a companion profile associated with the companion device.

\* \* \* \* \*